(12) United States Patent
Tone et al.

(10) Patent No.: US 9,394,948 B2
(45) Date of Patent: Jul. 19, 2016

(54) TORQUE FLUCTUATION ABSORBING APPARATUS

(71) Applicant: AISIN SEIKI KABUSHIKI KAISHA, Kariya-shi (JP)

(72) Inventors: Makoto Tone, Chiryu (JP); Suguru Jimbo, Tokai (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 245 days.

(21) Appl. No.: 13/962,512

(22) Filed: Aug. 8, 2013

(65) Prior Publication Data

US 2014/0066216 A1  Mar. 6, 2014

(30) Foreign Application Priority Data

Aug. 29, 2012  (JP) ................................ 2012-189083

(51) Int. Cl.
*F16F 15/14*  (2006.01)
*F16D 3/12*  (2006.01)

(52) U.S. Cl.
CPC ............... *F16D 3/12* (2013.01); *F16F 15/145* (2013.01)

(58) Field of Classification Search
CPC ............ F16F 15/145; F16F 15/14; F16D 3/12
USPC ....................................................... 74/574.2
See application file for complete search history.

(56) References Cited

U.S. PATENT DOCUMENTS

| 4,800,996 A | * | 1/1989 | Loizeau ................. F16D 13/68 |
| | | | 192/103 B |
| 5,976,020 A | * | 11/1999 | Lohaus et al. .................... 464/3 |
| 6,119,840 A | * | 9/2000 | Dettmar ..................... 192/70.17 |
| 6,382,050 B1 | * | 5/2002 | Carlson et al. ............... 74/570.2 |

(Continued)

FOREIGN PATENT DOCUMENTS

| DE | 19726532 A1 | 3/1998 |
| JP | S60-59841 U | 4/1985 |

(Continued)

OTHER PUBLICATIONS

The extended European Search Report issued on Apr. 1, 2015, by the European Patent Office in corresponding European Patent Application No. 13181175.4-1755. (6 pages).

(Continued)

*Primary Examiner* — Vicky Johnson
(74) *Attorney, Agent, or Firm* — Buchanan Ingersoll & Rooney PC

(57) ABSTRACT

A torque fluctuation absorbing apparatus absorbing a torsional vibration includes a plate member configured to be provided at a power transmission system and including a rolling guide surface, and a mass member rolling on the rolling guide surface of the plate member. The rolling guide surface includes plural first rolling guide surfaces each formed in an arc shape and provided radially inward relative to an outer circumferential portion of the plate member to be arranged in a circumferential direction and a second rolling guide surface allowing the mass member to roll on a locus which is different from a locus on the first rolling guide surface formed in the arc shape. Loci of the mass member are seamlessly switched from the locus in which the mass member rolls on the first rolling guide surface to the locus in which the mass member rolls on the second rolling guide surface.

14 Claims, 13 Drawing Sheets

(56) References Cited

U.S. PATENT DOCUMENTS

| | | | |
|---|---|---|---|
| 6,427,656 B1* | 8/2002 | Drecq et al. | ............... 123/192.1 |
| 2003/0037636 A1 | 2/2003 | Kawata et al. | |
| 2012/0222515 A1 | 9/2012 | Kinoshita et al. | |

FOREIGN PATENT DOCUMENTS

| | | |
|---|---|---|
| JP | 7-280037 A | 10/1995 |
| JP | H10-231895 A | 9/1998 |
| JP | H11-311309 A | 11/1999 |
| JP | 2001-153185 A | 6/2001 |
| JP | 2003-065392 A | 3/2003 |

OTHER PUBLICATIONS

Japanese Office Action issued by the Japanese Patent Office on Apr. 26, 2016 in corresponding Japanese Patent Appliction No. 2012-189083 and an English language translation; 7 pages.

* cited by examiner

F I G. 3
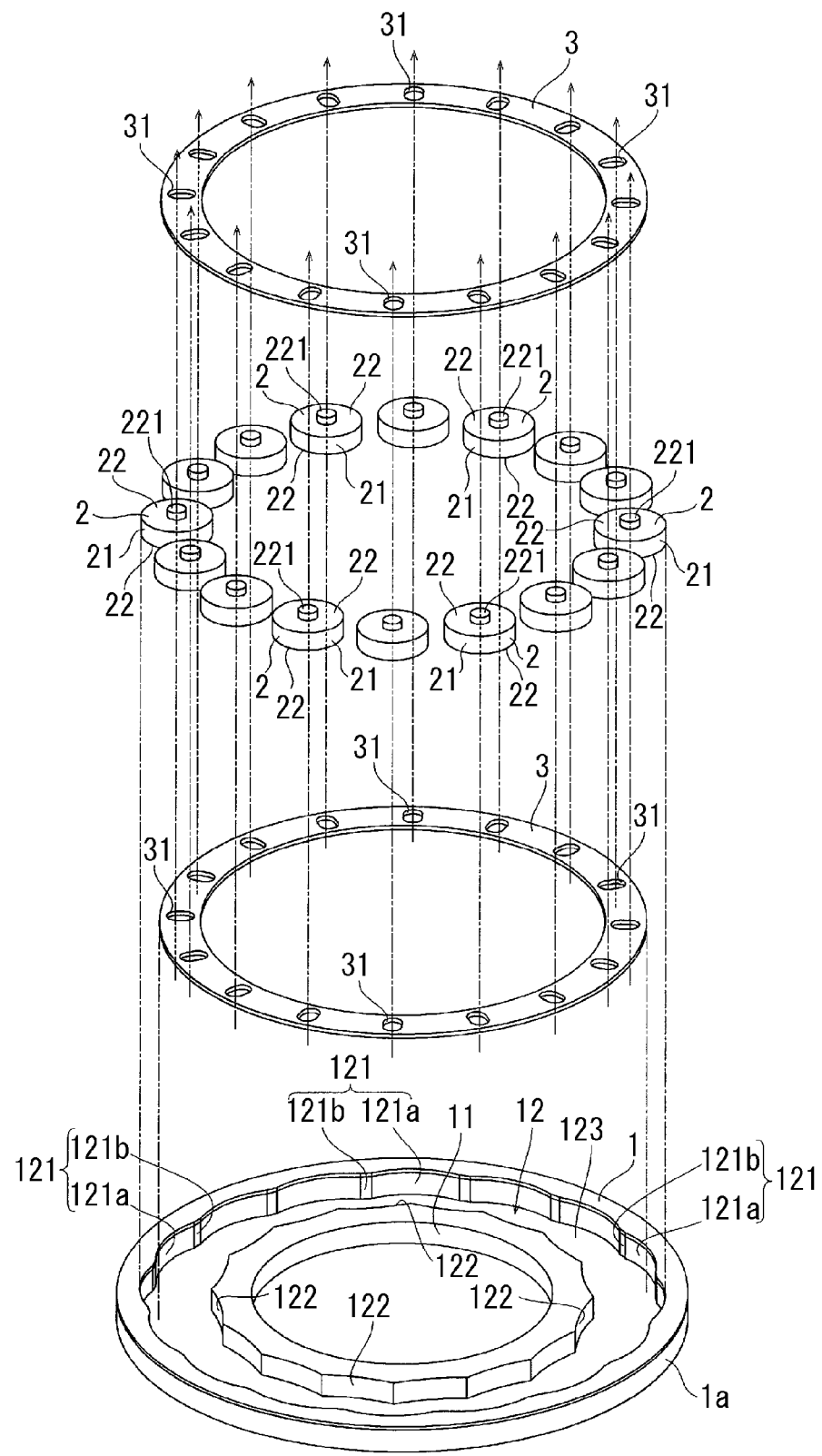

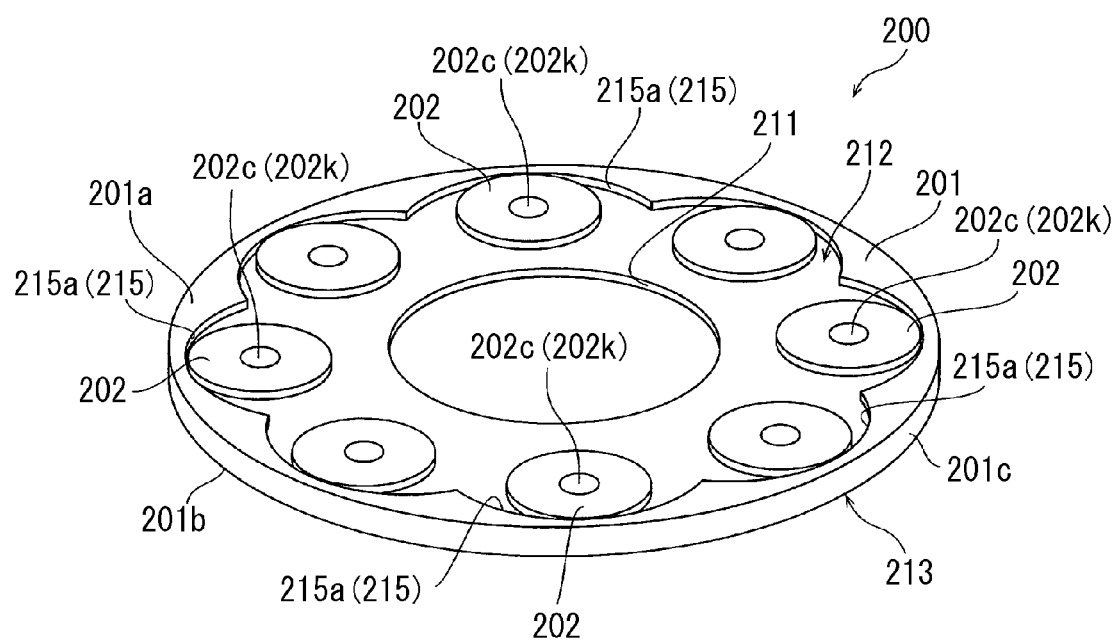
F I G. 10

US 9,394,948 B2

TORQUE FLUCTUATION ABSORBING APPARATUS

CROSS REFERENCE TO RELATED APPLICATIONS

This application is based on and claims priority under 35 U.S.C. §119 to Japanese Patent Application 2012-189083, filed on Aug. 29, 2012, the entire content of which is incorporated herein by reference.

TECHNICAL FIELD

This disclosure generally relates to a torque fluctuation absorbing apparatus.

BACKGROUND DISCUSSION

A known torque fluctuation absorbing apparatus for absorbing a torsional vibration of a power transmission system is disclosed, for example, in JP2003-65392A (hereinafter referred to as Patent reference 1).

Patent reference 1 discloses a dynamic damper (torque fluctuation absorbing apparatus) which is mounted to a drive shaft (power transmission system) of a compressor and includes a pulley (plate member) having six equally spaced recessed portions in a circumferential direction and six rollers (mass members) housed in the recessed portions, respectively. Each of the recessed portions of the dynamic damper is formed in a substantially semicircular configuration. The dynamic damper disclosed in Patent reference 1 is configured to absorb the torsional vibration of the drive shaft by rolling the rollers in a pendular manner along an arc shaped rolling guide surface formed by an inner surface of the substantially semicircular recessed portion.

According to the dynamic damper (torque fluctuation absorbing apparatus) disclosed in Patent reference 1, in a case where the torsional vibration of the drive shaft (power transmission system) is assumed to be equal to or greater than a predetermined level, a rolling range of the roller (mass member) rolling along the arc shaped roller guide surface is assumed to be greater, which causes a drawback that the roller impacts with, or collides with an end portion of the arc shaped roller guide surface. Thus, according to the dynamic damper disclosed in Patent reference 1, noise is generated because of the roller impacting with the end portion of the roller guide surface when the torsional vibration of the drive shaft is assumed to be equal to or greater than the predetermined level.

A need thus exists for a torque fluctuation absorbing apparatus which is not susceptible to the drawback mentioned above.

SUMMARY

In light of the foregoing, a torque fluctuation absorbing apparatus absorbing a torsional vibration of a power transmission system in response to a torque fluctuation of an engine includes a plate member configured to be provided at the power transmission system and including a rolling guide surface, and a mass member rolling on the rolling guide surface of the plate member. The rolling guide surface includes plural first rolling guide surfaces each formed in an arc shape and provided radially inward relative to an outer circumferential portion of the plate member to be arranged in a circumferential direction and a second rolling guide surface allowing the mass member to roll on a locus which is different from a locus on the first rolling guide surface formed in the arc shape. Loci of the mass member are seamlessly switched from the locus in which the mass member rolls on the first rolling guide surface to the locus in which the mass member rolls on the second rolling guide surface.

BRIEF DESCRIPTION OF THE DRAWINGS

The foregoing and additional features and characteristics of this disclosure will become more apparent from the following detailed description considered with the reference to the accompanying drawings, wherein:

FIG. 3 is an exploded perspective view illustrating a construction of the torque fluctuation absorbing apparatus according to the first embodiment disclosed here;

FIG. 10 shows a perspective view showing an overall construction of a torque fluctuation absorbing apparatus according to a second embodiment disclosed here;

DETAILED DESCRIPTION

Embodiments of a torque fluctuation absorbing apparatus will be explained with reference to illustrations of drawing figures as follows.

A construction of a torque fluctuation absorbing apparatus 100 according to a first embodiment will be explained with reference to FIGS. 1 to 6.

Figure 1:
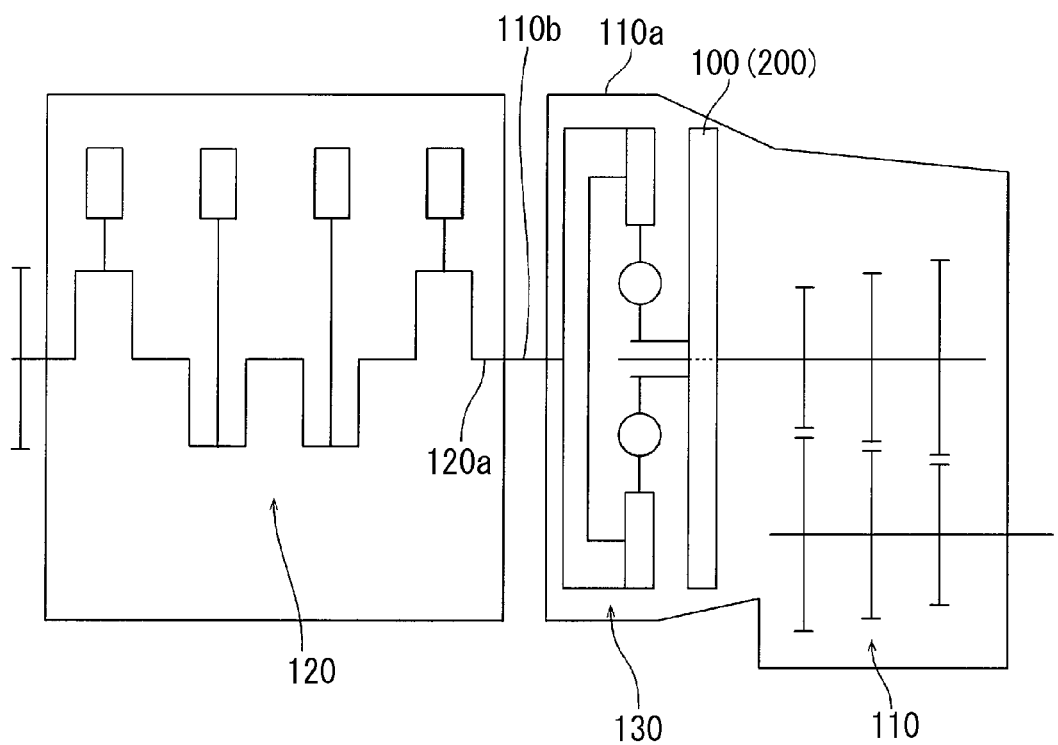
FIG. 1 is a schematic view illustrating an arrangement of a torque fluctuation absorbing apparatus according to first and second embodiments disclosed here.

As illustrated in FIG. 1, the torque fluctuation absorbing apparatus 100 is provided within a housing 110a of a transmission 110, and is configured to absorb a torsional vibration of a crankshaft (i.e., serving as a power transmission system) 120a caused in response to a torque fluctuation of an engine 120. More particularly, the torque fluctuation absorbing apparatus 100 is mounted to a damper 130 provided within the housing 110a of the transmission 110, and the damper 130 is connected to the crankshaft 120a of the engine 120 via an input shaft 110b. The damper 130 is provided to absorb a torsional vibration of the crankshaft 120a caused in response to the torque fluctuation of the engine 120 together with the torque fluctuation absorbing apparatus 100. The crankshaft 120a serves as an example of a power transmission system. Structures of the torque fluctuation absorbing apparatus 100 according to the first embodiment will be explained in detail hereinafter.

Figure 2:
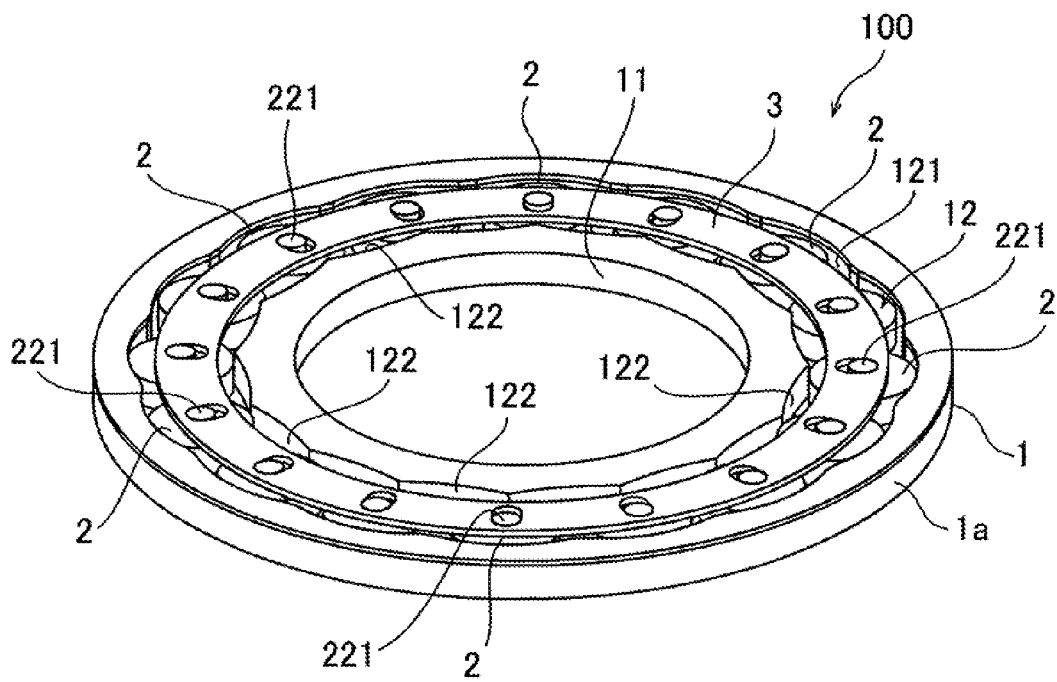
FIG. 2 is a perspective view illustrating a construction of the torque fluctuation absorbing apparatus according to the first embodiment disclosed here.

As illustrated in FIGS. 2 and 3, the torque fluctuation absorbing apparatus 100 includes a plate member 1 having a disc shape with hollow (donut shape) and mounted to the crankshaft 120a (see FIG. 1) via the damper 130 (see FIG. 1), plural mass members 2, and a pair of annular connection members 3 connecting the plural mass members from one another.

Figure 4:
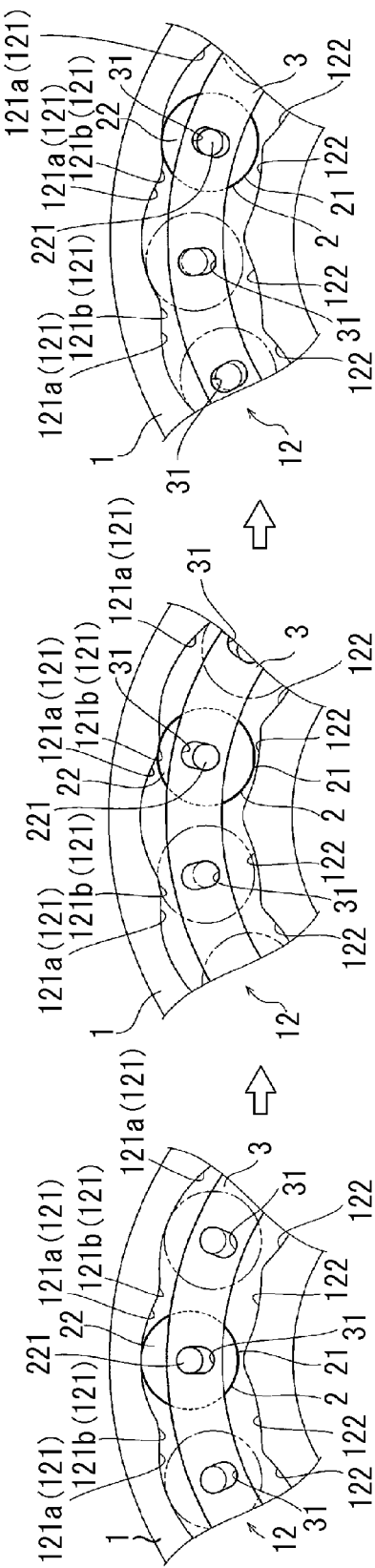
FIG. 4A is an explanatory view for explaining a rolling locus of a mass member of the torque fluctuation absorbing apparatus and a state where the mass member rolls on a first rolling guide surface according to the first embodiment disclosed here.
FIG. 4B is an explanatory view for explaining the rolling locus of the mass member of the torque fluctuation absorbing apparatus and a state where the mass member rolls on a second rolling guide surface according to the first embodiment disclosed here.
FIG. 4C is an explanatory view for explaining the rolling locus of the mass member of the torque fluctuation absorbing apparatus and a state where the mass member moves to the adjacent first rolling guide surface according to the first embodiment disclosed here.
Figure 5:
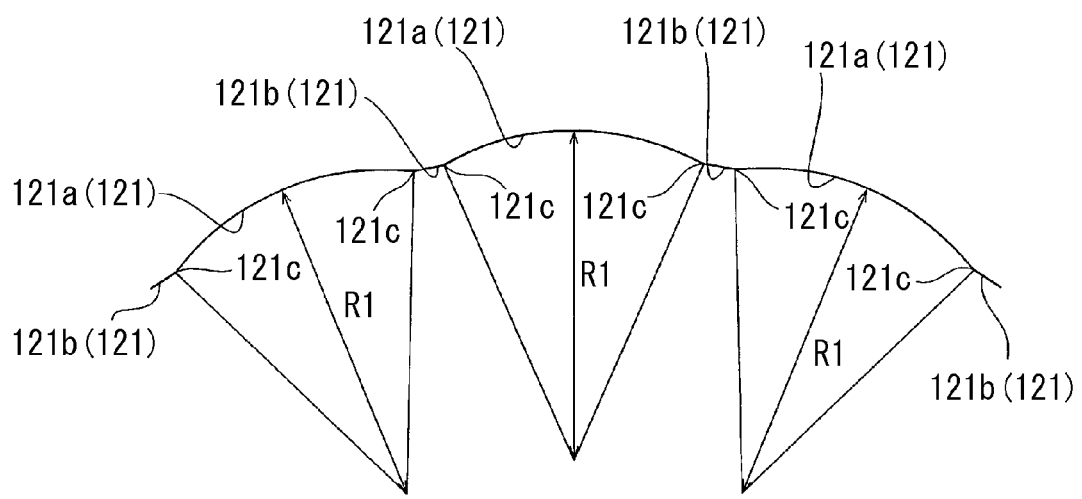
FIG. 5 is a view showing a rolling guide surface of the torque fluctuation absorbing apparatus according to the first embodiment disclosed here.

The plate member 1 made from metal plate member includes a circular hollow portion 11 penetrating in a plate thickness direction, and an accommodation portion 12 formed to be annularly recessed along an outer circumferential portion 1a. As illustrated in FIGS. 2 to 4, the accommodation portion 12 is configured to accommodate the plural mass members 2 therewithin. Further, the accommodation portion 12 includes a rolling guide surfaces 121 formed by an inner side surface at the outer circumferential portion 1a. The rolling guide surface 121 is configured to guide the mass member 2 to roll within the accommodation portion 12. More particularly, as illustrated in FIGS. 3 to 5, the rolling guide surface 121 includes plural arc shaped first rolling guide surfaces 121a and plural second rolling guide surfaces 121b connecting the adjacent first rolling guide surfaces 121a. The first rolling guide surface 121a serves as an example of an outer circumferential side rolling guide surface.

Each of the plural first rolling guide surfaces 121a are formed in an arc shape protruding outward in a radial direction of the plate member 1. Radius R1 of curvature (see FIG. 5) of the arc shaped first rolling guide surface 121a is set at a radius of curvature with which the mass member 2 is allowed to resonate (i.e., radius of curvature with which the mass member 2 is likely to roll the most) when rolling on the first rolling guide surface 121a at a torsional vibration with a predetermined order (i.e., torsional vibration with a predetermined frequency at which the mass member is likely to roll the most). Thus, by the rolling (resonance) of the mass member 2 on the first rolling guide surface 121a, the torsional vibration with the predetermined order can be absorbed. Further, the plural first rolling guide surfaces 121a are formed to be adjacent to one another via the second rolling guide surface 121b in a circumferential direction of the plate member 1. Further, the plural arc shaped first rolling guide surfaces 121a are arranged radially inward relative to the outer circumferential portion 1a of the plate member 1 in a circumferential direction. The plural second rolling guide surfaces 121b are provided radially inward relative to the outer circumferential portion 1a of the plate member 1 in the circumferential direction and is configured to roll the mass member 2 on a locus which is different from a rolling locus of the mass member 2 on the arc shaped first rolling guide surfaces 121a. The plural second rolling guide surfaces 121b are configured to guide the mass member 2 to move to the adjacent first rolling guide surface 121a when the mass member 2 moves from the first rolling guide surface 121a to the adjacent first rolling guide surface 121a.

As shown in FIG. 5, the first rolling guide surface 121a is formed to have an arc shape with the radius R1 of curvature, and the second rolling guide surface 121b is formed to have a flat surface. Further, a connection portion 121c of the first rolling guide surface 121a and the second rolling guide surface 121b is formed to have a curved surface so that the first rolling guide surface 121a with the arced shape and the second rolling guide surface 121b with the flat surface are smoothly connected.

As illustrated in FIGS. 2 to 4, the accommodation portion 12 of the plate member 1 includes plural arc shaped inner circumferential side restriction surfaces 122 formed at an inner side portion at the inner circumferential side of the plate member 1 (inner side in a radial direction) provided at radially inward relative to the rolling guide surface 121. The plural inner circumferential side restriction surfaces 122 are arranged in a circumferential direction to restrict the motion of the mass member 2 in a radially inward direction. More particularly, the inner circumferential side restriction surface 122 prevents the mass member 2 from falling (moving) equal to or greater than a predetermined amount (level) when the mass member 2 falls (moves) inward of the plate member 1 in a radial direction by a self-weight because the centrifugal force directed towards radially outward of the plate member 1 is assumed to be smaller when the rotation speed of the crankshaft 120a becomes smaller. In a case where the rotation speed of the crankshaft 120a is smaller, the plural mass members 2 integrally fall (move) because the mass members 2 are connected one another by means of the connection member 3. Further, each of the plural inner circumferential side restriction surfaces 122 is formed in an arc shape protruding radially inward of the plate member 1. Still further, as illustrated in FIGS. 4A to 4C, the plural inner circumferential side restriction surfaces 122 are equally spaced in a manner that each of the inner circumferential side restriction surface 122 is shifted by a half pitch relative to each of the plural arc shaped first rolling guide surfaces 121a in a circumferential direction. That is, the second rolling guide surfaces 121b arranged between two of the arc shaped first rolling guide surfaces 121a which are adjacent to each other is positioned at a position corresponding to a center of the arc shaped inner circumferential side restriction surface 122. Further, the arc shaped inner circumferential side restriction surface 122 includes a radius of curvature smaller than the radius R of curvature of the first rolling guide surface 121a.

Figure 6:
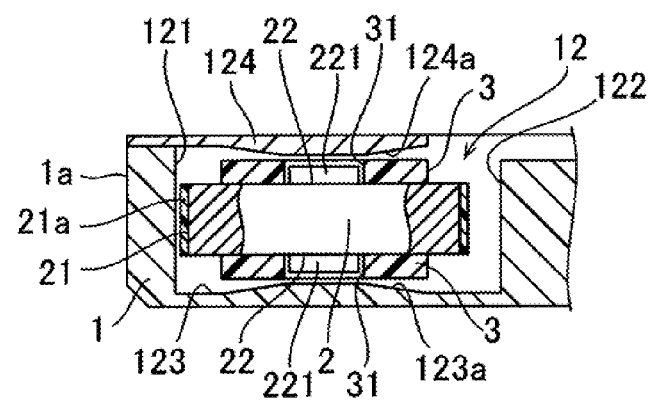
FIG. 6 is a partial cross-sectional view showing surroundings of the mass member of the torque fluctuation absorbing apparatus according to the first embodiment disclosed here.

As illustrated in FIG. 6, a tapered portion 123a protruding towards the mass member 2 is formed on an inner bottom surface 123 of the accommodation portion 12 of the plate member 1. The tapered portion 123a includes a substantially trapezoidal cross-section, and is seamlessly formed in a circumferential direction so as to be annularly formed in a planer view. The tapered portion 123a is formed at a portion facing the annular connection member 3 which connects the plural mass members 2. Further, a cover member 124 for preventing the mass member 2 from coming out the accommodation portion 12 is provided at a side opposite from the inner bottom surface 123 relative to the mass member 2 accommodated in the accommodation portion 12. The cover member 124 is fixedly provided at the plate member 1 by means of, for example, a fastening member. Similarly to the inner bottom surface 123, a tapered portion 124a protruding towards the mass member 2 is formed at the cover member 124 at a portion facing the connection member 3. The tapered portion 124a includes a substantially trapezoidal cross-section, and is seamlessly formed in a circumferential direction so as to be annularly formed in a planer view. In those circumstances, alternatively, with a structure in which the mass member 2 is prevented from coming out from the accommodation portion 12 by a member provided adjacent to the torque fluctuation absorbing apparatus 100 (e.g., flywheel), the cover member 124 is not necessarily provided.

The mass member 2 made from a metal member is formed in a columnar configuration as illustrated in FIGS. 2 to 4C. As illustrated in FIGS. 3, 4A, 4B, 4C, and 6, the mass member 2 includes a cylindrical rolling surface 21 formed with an outer peripheral surface thereof. The mass member 2 is accommodated within the accommodation portion 12 in a manner that the rolling surface 21 faces the rolling guide surface 121. The rolling surface 21 is guided by the rolling guide surface 121 to roll the mass member 2. Further, as illustrated in FIG. 6, an anti-skid member 21a is attached onto the rolling surface 21 so as to cover an outer periphery portion of the mass member 2. The anti-skid member 21a is made of resin (e.g., Nylon 6 or polycaprolactam (PA6), Nylon 66 (PA66)) and is provided to restrain the mass member 2 from skidding relative to the rolling guide surface 121. Further, as illustrated in FIGS. 2, 3, 4A, 4B, 4C, and 6, a protrusion portion 221 is formed on the mass member 2 at each of opposite surfaces 22 which are arranged orthogonal to the rolling surface 21 of the mass member 2. The protrusion portion 221 is cylindrically formed and is positioned at a center of a circular side surface 22. The protrusion portion 221 serves as an example of a first engagement portion.

As illustrated in FIGS. 3 and 6, the annular connection members 3 serving as a pair are arranged to sandwich the mass member 2 at the opposite surfaces 22. Further, as illustrated in FIGS. 2, 4A, 4B, and 4C, the connection member 3 connects the plural mass members 2 while retaining, or maintaining a state where the mass members 2 are equally spaced in a circumferential direction with a predetermined distance. Particularly, as illustrated in FIGS. 3, 4A, 4B, 4C, and 6, the connection member 3 includes plural hole portions 31 each of which is formed in an oblong, or oval shape (track shape) and to each of which the protrusion portion 221 of the mass member 2 is inserted to be engaged. The hole portion 31 serves as an example of a second engagement portion. The plural hole portions 31 are equally spaced in a circumferential direction and are formed penetrating through the connection member 3 in a plate-thickness direction. Further, the hole portion 31 which is formed in an oblong, or oval shape is formed extending in a radial direction of the plate member 1. The protrusion portion 221 of the mass member 2 is engaged with the hole portion 31 in a manner that the protrusion portion 221 is movable in a radial direction. More particularly, the oblong, or oval shaped hole portion 31 allows the mass member 2 to move in a radial direction when the mass member 2 rolls at the first rolling guide surface 121a in a pendular manner. Further, the hole portion 31 allows the mass member 2 to move radially inward while avoiding the protrusion portion 221 of the mass member 2 from contacting a radially inner end portion of the hole portion 31 and avoiding the mass member 2 from contacting the inner circumferential side restriction surfaces 122.

The connection member 3 is made of resin (e.g., polyacetal) which excels in heat resistance and in abrasion resistance, and thus generation of a noise because of collision of the protrusion portion 221 of the mass member 2 with the hole portion 31 of the connection member 3 can be reduced compared to a construction in which the connection member 3 is made of metal. Further, as illustrated in FIG. 6, the connection member 3 includes a plate thickness which is greater than a protruding height of the protrusion portion 221 so that the protrusion portion 221 of the mass member 2 positioned in the hole portion 31 does not contact the inner bottom surface 123 of the plate member 1 and the cover member 124.

According to the torque fluctuation absorbing apparatus 100 of the first embodiment, the torsional vibration with the predetermined order of the crankshaft 120a is absorbed by the resonance caused by the rolling motion of the plural mass members 2 on the respective first rolling guide surfaces 121a of the plate member 1 in a pendular manner. Further, according to the torque fluctuation absorbing apparatus 100, when the torsional vibration of the crankshaft 120a is assumed to be equal to or greater than a predetermined level, loci of the mass member 2 are seamlessly switched from a locus in which the mass member 2 rolls on the first rolling guide surface 121a to a locus in which the mass member 2 rolls on the second rolling guide surface 121b. Further, the torque fluctuation absorbing apparatus 100 is configured to further seamlessly switch the loci from the locus in which the mass member 2 rolls on the second rolling guide surface 121b to the locus in which the mass member 2 rolls on the first rolling guide surface 121a after seamlessly switching the loci from the locus in which the mass member 2 rolls on the first rolling guide surface 121a to the locus in which the mass member 2 rolls on the second rolling guide surface 121b. That is, as illustrated in FIGS. 4A to 4C, the mass member 2 rolls on the first rolling guide surface 121a in a pendular manner when the torsional vibration of the crankshaft 120a is less than the predetermined level, and when the torsional vibration of the crankshaft 120a is assumed to be equal to or greater than the predetermined level, the mass member 2 moves from the first rolling guide surface 121a to the adjacent first rolling guide surface 121a via the second rolling guide surface 121b.

Hereinafter, a rolling locus of the mass member 2 of the torque fluctuation absorbing apparatus 100 according to the first embodiment will be explained with reference to FIGS. 4 an 5.

In a case where the torsional vibration of the crankshaft 120a is less than the predetermined level, the mass member 2 rolls on the first rolling guide surface 121a in a pendular manner to absorb the torsional vibration with the predetermined order. When the torsional vibration of the crankshaft 120a is assumed to be equal to or greater than the predetermined level, as illustrated in FIGS. 4A and 4B, the rolling range of the mass member 2 at the first rolling guide surface 121a is assumed to be greater so that the mass member 2 moves to the second rolling guide surface 121b. The plural mass members 2 move while retaining the predetermined distance from one another by means of the connection member 3. Further, at the second rolling guide surface 121b, the mass member 2 is allowed to move radially inward of the plate member 1 while avoiding the protrusion portion 221 from contacting the inner end portion of the hole portion 31 of the connection member 3. In those circumstances, the inward motion of the mass member 2 is restricted so that the mass member 2 does not contact the inner circumferential side restriction surface 122. Thus, the mass member 2 rolls on a locus which does not largely move, or shift inwardly in a radial direction of the plate member 1 when rolling on the second rolling guide surface 121b. Further, because the first rolling guide surface 121a and the second rolling guide surface 121b are smoothly connected by the connection portion 121c (see FIG. 5) with curved surface, the mass member 2 smoothly moves from the first rolling guide surface 121a to the second rolling guide surface 121b.

Then, the mass member 2 rolls on the second rolling guide surface 121b with flat surface to move to the adjacent first rolling guide surface 121a. In those circumstances, because the second rolling guide surface 121b and the adjacent first rolling guide surface 121a are smoothly connected by the connection portion 121c with curved surface, the mass member 2 smoothly moves from the second rolling guide surface 121b to the adjacent first rolling guide surface 121a. That is, when the torsional vibration of the crankshaft 120a is assumed to be equal to or greater than the predetermined level, the rolling loci of the mass member 2 are seamlessly, or continuously switched from the locus in which the mass member 2 rolls on the first rolling guide surface 121a to the locus in which the mass member 2 rolls on the second rolling guide surface 121b, and are further seamlessly, or continuously switched from the locus in which the mass member 2 rolls on the second rolling guide surface 121b to the locus in which the mass member 2 rolls on the first rolling guide surface 121a. Further, during a period that the mass member 2 moves from the first rolling guide surface 121a to the adjacent first rolling guide surface 121a via the second rolling guide surface 121b, the mass member 2 is constantly in contact with the rolling guide surface 121 (first and second rolling guide surfaces 121a, 121b) to roll thereon and does not come in contact with the inner circumferential side restriction surface 122. Still further, the mass member 2 repeats the rolling motion from the first rolling guide surface 121a to the adjacent first rolling guide surface 121a via the second rolling guide surface 121b until the torsional vibration of the crankshaft 120a is assumed to be less than the predetermined level.

According to the first embodiment, because the rolling loci of the mass member 2 can be smoothly transited from the locus in which the mass member 2 rolls on the first rolling guide surface 121a to the second rolling guide surface 121b by configuring that the loci of the mass member 2 are seamlessly, or continuously switched from the locus in which the mass member 2 rolls on the first rolling guide surface 121a formed in an arced shape to the locus in which the mass member 2 rolls on the second rolling guide surface 121b which is different from the locus in which the mass member 2 rolls on the first rolling guide surface 121a, even when the torsional vibration of the crankshaft 120a is assumed to be equal to or greater than the predetermined level, the mass member 2 of the embodiment does not collide with an end portion of the rolling guide surface and a stopper member restricting a moving range of the mass member 2. Thus, even when the torsional vibration of the crankshaft 120a is assumed to be equal to or greater than the predetermined level, the generation of the noise because of the collision of the mass member 2 can be restrained.

According to the construction in which the loci of the mass member 2 are seamlessly, or continuously switched from the locus in which the mass member 2 rolls on the first rolling guide surface 121a which is formed in an arced shape to the locus in which the mass member 2 rolls on the second rolling guide surface 121b which is different from the first rolling guide surface 121a when the torsional vibration of the crankshaft 120a is assumed to be equal to or greater than the predetermined level, provided that the locus of the mass member 2 rolling on the second rolling guide surface 121b is set to be linear or curved line which does not largely move, or shift radially inward of the plate member 1, the mass member 2 is restrained from largely moving, or shifting radially inward of the plate member 1 after the loci of the mass member 2 are switched from the locus in which the mass member 2 rolls on the first rolling guide surface 121a to the locus in which the mass member 2 rolls on the second rolling guide surface 121b. In those circumstances, because a moving range of the mass member 2 in a radial direction of the plate member 1 can be restrained, the torque fluctuation absorbing apparatus 100 can be downsized by that level, and thus, in consequence, the generation of the noise because of the collision of the mass member 2 when the torsional vibration of the crankshaft 120a is assumed to be equal to or greater than the predetermined level can be restrained while downsizing the torque fluctuation absorbing apparatus 100.

Further, according to the first embodiment, the loci of the mass member 2 are switched in a manner that the locus of the mass member 2 is further seamlessly, or continuously switched from the locus in which the mass member 2 rolls on the second rolling guide surface 121b to the locus in which the mass member 2 rolls on the first rolling guide surface 121a after the loci of the mass member 2 are seamlessly, or continuously switched from the locus in which the mass member 2 rolls on the first rolling guide surface 121a to the locus in which the mass member 2 rolls on the second rolling guide surface 121b. Thus, in addition to seamlessly, or continuously switching the locus in which the mass member 2 rolls on the first rolling guide surface 121a to the locus in which the mass member 2 rolls on the second rolling guide surface 121b, because the loci are seamlessly, or continuously switched from the locus in which the mass member 2 rolls on the second rolling guide surface 121b to the locus in which the mass member 2 rolls on the first rolling guide surface 121a, the rolling locus of the mass member 2 can be smoothly transited in either cases where the rolling loci of the mass member 2 are switched from the locus in which the mass member 2 rolls on the first rolling guide surface 121a to the second rolling guide surface 121b and where the rolling loci of the mass member 2 are switched from the locus in which the mass member 2 rolls on the second rolling guide surface 121b to the locus in which the mass member 2 rolls on the first rolling guide surface 121a. In consequence, even when the torsional vibration of the crankshaft 120a is assumed to be equal to or greater than the predetermined level, the generation of the noise, for example, by the collision of the mass member 2 with the end portion of the rolling guide surface and the stopper member can be further restrained.

Further, even when the rolling loci of the mass member 2 are changed from the locus in which the mass member 2 rolls on the first rolling guide surface 121a to the locus in which the mass member 2 rolls on the second rolling guide surface 121b in a case where the torsional vibration of the crankshaft 120a is assumed to be equal to or greater than the predetermined level, the loci can be returned from the locus in which the mass member 2 rolls on the second rolling guide surface 121b to the locus in which the mass member 2 rolls on the first rolling guide surface 121a readily, thus, the torsional vibration of the crankshaft 120a can be absorbed by the rolling of the mass member 2 returning to the first rolling guide surface 121a.

According to the first embodiment, the plural first rolling guide surfaces 121a which are formed in arced shape of the plate member 1 are arranged to adjacent one another in a circumferential direction via the second rolling guide surface 121b, and when the torsional vibration of the crankshaft 120a becomes equal to or greater than the predetermined level, the mass member 2 moves to the adjacent first rolling guide surface 121a via the second rolling guide surface 121b. Accordingly, because the mass member 2 moves from the first rolling guide surface 121a to the adjacent first rolling guide surface 121a in the circumferential direction via the second rolling guide surface 121b when the torsional vibration of the crankshaft 120a is assumed to be equal to or greater than the predetermined level, the mass member 2 is moved while retaining, or maintaining a contact with the first rolling guide surface 121a, the second rolling guide surface 121b, and the adjacent first rolling guide surface 121a along the circumference direction of the plate member 1. In consequence, even when the torsional vibration of the crankshaft 120a is assumed to be equal to or greater than the predetermined level, the mass member 2 is effectively restrained from largely moving, or shifting inward in a radial direction of the plate member 1.

Further, according to the first embodiment, the plural arc shaped first rolling guide surfaces 121a which adjacent to one another in a circumferential direction are provided at an outer peripheral side of the plate member 1, the second rolling guide surface 121b is provided to connect the first rolling guide surfaces 121a which are adjacent each other, and the mass member 2 is guided to move to the adjacent first rolling guide surface 121a when the torsional vibration of the crankshaft 120a is assumed to be equal to or greater than the predetermined level. Thus, when the torsional vibration of the crankshaft 120a is assumed to be equal to or greater than the predetermined level, the mass member 2 is guided by the second rolling guide surface 121b to smoothly move to the adjacent first rolling guide surface 121a.

Further, according to the first embodiment, the plural arc shaped inner circumferential side restriction surfaces 122 arranged in a circumferential direction for restricting the motion of the mass member 2 in a radial direction can be provided at a radially inner side of the plate member 1 relative to the first rolling guide surface 121a. Accordingly, because the inner circumferential side restriction surface 122 restricts the mass member 2 from moving radially inward of the plate member 1 even when the mass member 2 falls (moves) inward of the plate member 1 in a radial direction by a self-weight because the centrifugal force directed towards radially outward of the plate member 1 is assumed to be smaller when the rotation speed of the crankshaft 120a becomes smaller, an increase of the moving range of the mass member 2 in a radial direction of the plate member 1 can be restrained.

Further, according to the first embodiment, the inner circumferential side restriction surface 122 is shifted by a half pitch relative to the first rolling guide surface 121a in a circumferential direction. According to the foregoing construction, because a distance in a radial direction of the plate member 1 between the first rolling guide surface 121a and the inner circumferential side restriction surface 122 is prevented from being partially excessively increased, a partial excessive increase of a falling distance (moving distance) of the mass member 2 when falling (moving) radially inward of the plate member 1 can be restrained. Accordingly, even when the mass member 2 falls, or moves to collide with the inner circumferential side restriction surface 122 (i.e., the motion of the mass member 2 is restricted), the noise caused by the collision can be reduced by the level of the shortened falling distance.

Further, according to the first embodiment, the annular connection member 3 connects the plural mass members 2 while retaining a state where the plural mass members 2 are equally spaced keeping a predetermined distance from one another. Thus, even when the mass member 2 moves from the first rolling guide surface 121a to the adjacent first rolling guide surface 121a via the second rolling guide surface 121b, because the distances between the mass members 2 are retained by the connection member 3, a contact, or collision of the adjacent mass members 2 can be prevented. Accordingly, the generation of the noise because of the collision is restrained.

Further, by connecting plural mass members by means of the annular connection member 3, because the plural mass members 2 arranged in a circumferential direction can be connected as a bunch by the single connection member 3, an increase in the number of parts can be restrained compared to a structure in which separate connection members are provided between respective adjacent mass members 2. Further, because the adjacent mass members 2 are connected in a state where the mass members 2 are spaced keeping a small distance, or an interval from one another and the small distance can be retained, compared to a structure in which the connection member 3 is not provided, the distance, or interval between the adjacent mass members 2 can be reduced. Because the greater number of the mass members 2 can be provided according to the foregoing construction, accordingly, torsional vibration absorbing effects can be enhanced.

Further, according to the first embodiment, the protrusion portion 221 is provided at each of the plural mass members 2, and the hole portions 31 to each of which each of the protrusion portions 221 of the plural mass members 2 engages to be movable in a radial direction of the plate member 1 are provided at the connection member 3. Thus, with a simple construction of the protrusion portion 221 and the hole portion 31, the distance, or interval between the mass members 2 can be retained while allowing the mass member 2 to move in a radial direction of the plate member 1 when the mass member 2 rolls.

Further, according to the first embodiment, the tapered portion 123a is formed at the portion where the connection member 3 and the plate member 1 face each other. Thus, because an area of contact of the connection member 3 and the plate member 1 can be reduced, hysteresis loss caused by the sliding resistance between the connection member 3 and the plate member 1 can be reduced.

According to the first embodiment, the second rolling guide surface 121b is formed to have a flat surface. Thus, compared to a structure in which the second rolling guide surface 121b is formed to protrude radially inward of the plate member 1, because the moving amount of the mass member 2 moving radially inward against the centrifugal force when rolling on, or passing or crossing the second rolling guide surface 121b can be reduced, the mass member 2 can be more readily moved to the adjacent first rolling guide surface 121a via the second rolling guide surface 121b.

Further, according to the first embodiment, the anti-skid member 21a is provided to cover the outer periphery of the mass member 2. Accordingly, because the anti-skid member 21a restrains the mass member 2 from slipping when rolling on the first rolling guide surface 121a, the subject torsional vibration with the predetermined order can be effectively absorbed.

First to seventh modified examples of the first embodiment will be explained as follows. As illustrated in FIG. 6, according to the first embodiment, the tapered portion 123a and the tapered portion 124a protruding towards the mass member 2 are formed at the inner bottom surface 123 of the accommodation portion 12 of the plate member 1 and the cover member 124, respectively. However, the construction may be modified as the first to fifth modified examples illustrated in FIGS. 7A to 7E, respectively.

Figure 7A:
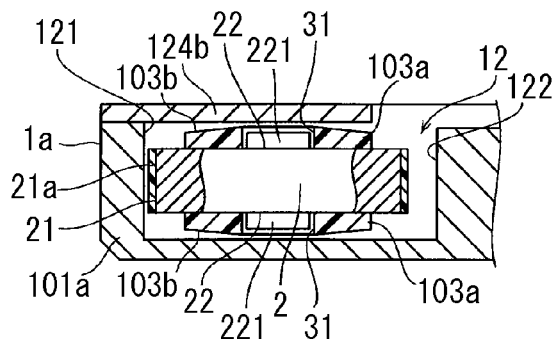
FIG. 7A shows a first modified example of the first embodiment disclosed here.
Figure 7B:
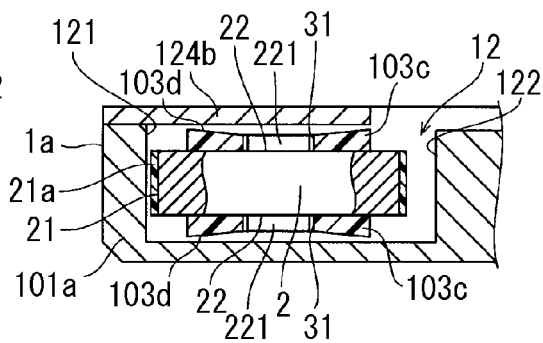
FIG. 7B shows a second modified example of the first embodiment disclosed here.
Figure 7C:
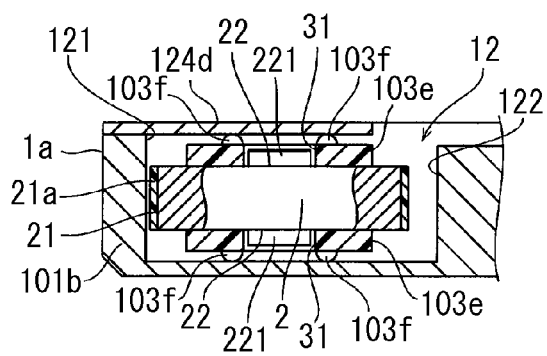
FIG. 7C shows a third modified example of the first embodiment disclosed here.
Figure 7D:
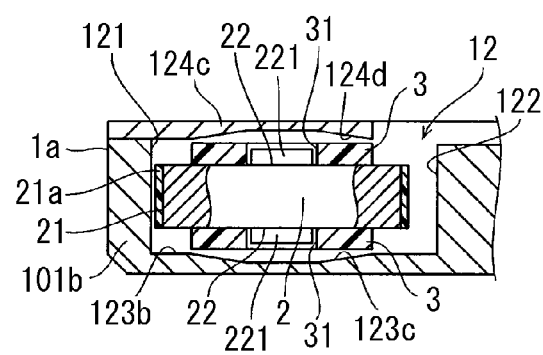
FIG. 7D shows a fourth modified example of the first embodiment disclosed here.
Figure 7E:
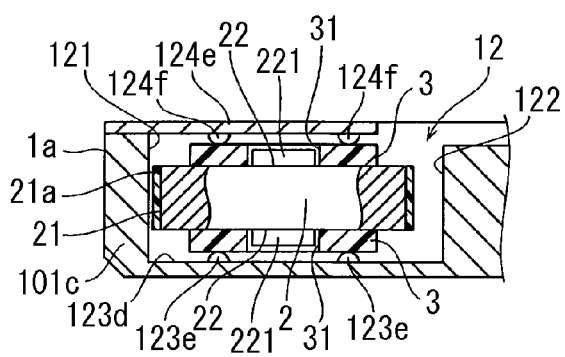
FIG. 7E shows a fifth modified example of the first embodiment disclosed here.

More particularly, according to the first modified example illustrated in FIG. 7A, a tapered portion 103b protruding towards a plate member 101a (cover member 124b) is formed at a connection member 103a at a portion facing the plate member 101a (cover member 124b). Further, according to the second modified example illustrated in FIG. 7B, a tapered portion 103d which is recessed towards the mass member 2 is formed at a connection member 103c at a portion facing the plate member 101a (cover member 124b). Further, according to a third modified example illustrated in FIG. 7C, a protrusion portion 103f protruding towards the plate member 101a (cover member 124b) is formed at a connection member 103e at a portion facing the plate member 101a (cover member 124b). Still further, according to a fourth modified example illustrated in FIG. 7D, a tapered portion 123c and a tapered portion 124d which are recessed in opposite directions from the mass member 2 are formed at an inner bottom surface 123b of the accommodation portion 12 of a plate member 101b and a cover member 124c, respectively. Further, according to the fifth modified example illustrated in FIG. 7E, a protrusion portion 123e and a protrusion portion 124f which protrude towards the mass member 2 are formed at an inner bottom surface 123d of the accommodation portion 12 of a plate member 101c and a cover member 124e, respectively.

Figure 8:
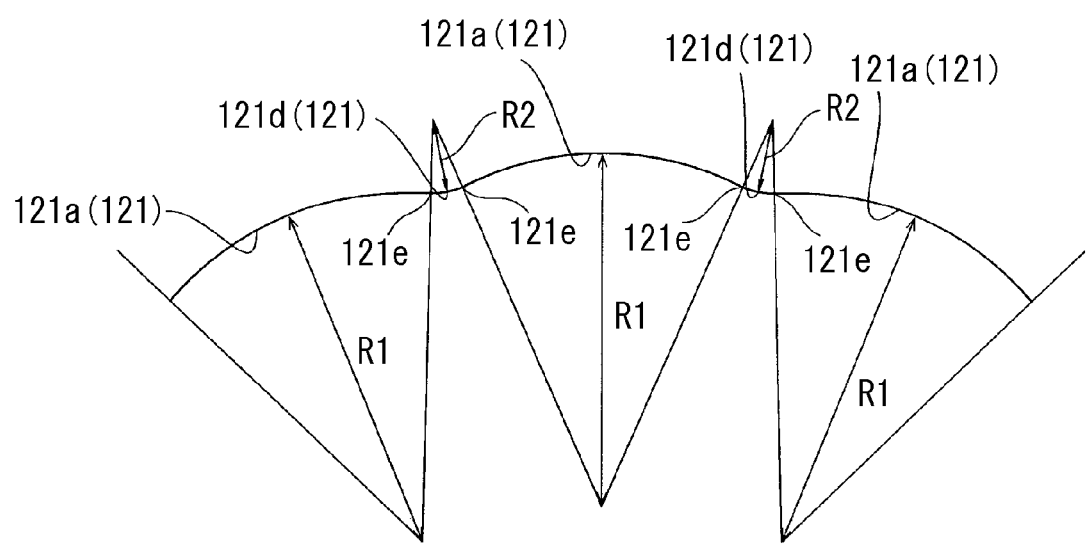
FIG. 8 shows a sixth modified example of the first embodiment disclosed here.

Further, whereas the second rolling guide surface 121b is formed to have a flat surface according to the first embodiment, alternatively, according to the sixth modified example of the first embodiment illustrated in FIG. 8, a second rolling guide surface 121d is formed in an arced shape with a radius R2 of curvature which is smaller than the radius R1 of curvature of the first rolling guide surface 121a. In those circumstances, the second rolling guide surface 121d is formed in an arced shape protruding radially inward of the plate member. Further, a connection portion 121e of the first rolling guide surface 121a and the second rolling guide surface 121d is formed with a curved surface so as to smoothly connect the first rolling guide surface 121a which is in the arced shape and the second rolling guide surface 121d which is in the arced shape which protrude in an opposite direction to the protruding direction of the first rolling guide surface 121a.

Figure 9:
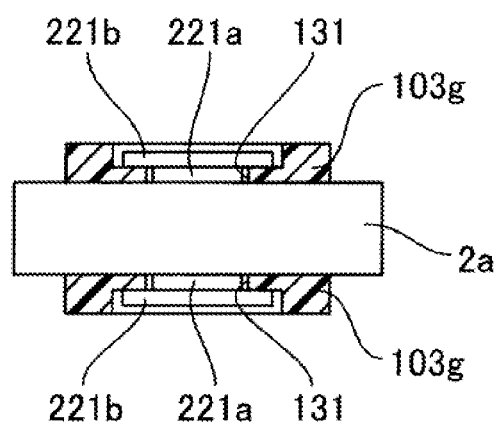
FIG. 9 shows a seventh modified example of the first embodiment disclosed here.

Further, whereas the connection member 3 and the mass member 2 are separately provided according to the first embodiment, alternatively, according to the seventh modified example of the first embodiment illustrated in FIG. 9, a pair of annular connection members 103g and a mass member 2a are integrally formed. Particularly, a clinching portion 221b is formed by clinching a tip end portion of a protrusion portion 221a in a state where the protrusion portion 221a of the mass member 2a is positioned, or inserted in the hole portion 131 of a connection member 103g. The clinching portion 221b prevents the connection member 103g from falling, or disengaging from the mass member 2a and integrally forms the mass member 2a and the connection member 103g. Accordingly, because the plural mass members 2a and the annular connection members 103g serving as a pair can be formed as one unit (i.e., as a sub-assembly), assembling workability, or assembling performance of the torque fluctuation absorbing apparatus can be enhanced. In those circumstances, the hole portion 131 serves as an example of a second engagement portion, and the protrusion portion 221a serves as an example of a first engagement portion.

A torque fluctuation absorbing apparatus 200 according to a second embodiment of the disclosure will be explained with reference to FIGS. 10 to 14. According to the second embodiment, a second rolling guide surface 215b (i.e., serving as a rolling guide surface) is configured so that a mass member 202 rolls thereon with a smaller turning radius compared to on an arc shaped first rolling guide surface 215a (i.e., serving as a rolling guide surface).

Figure 11:
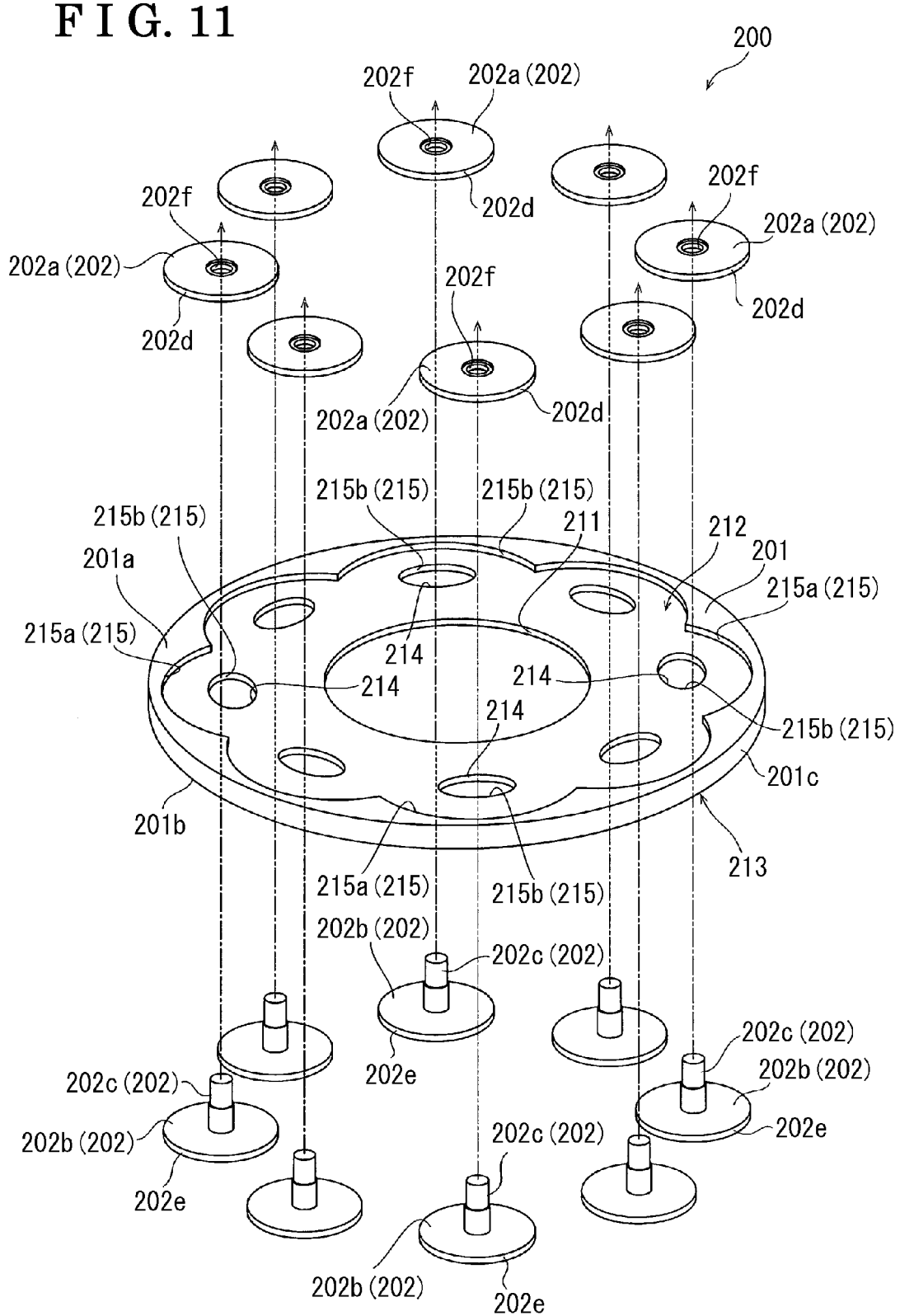
FIG. 11 shows an exploded perspective view showing the overall construction of the torque fluctuation absorbing apparatus according to the second embodiment disclosed here.
Figure 12:
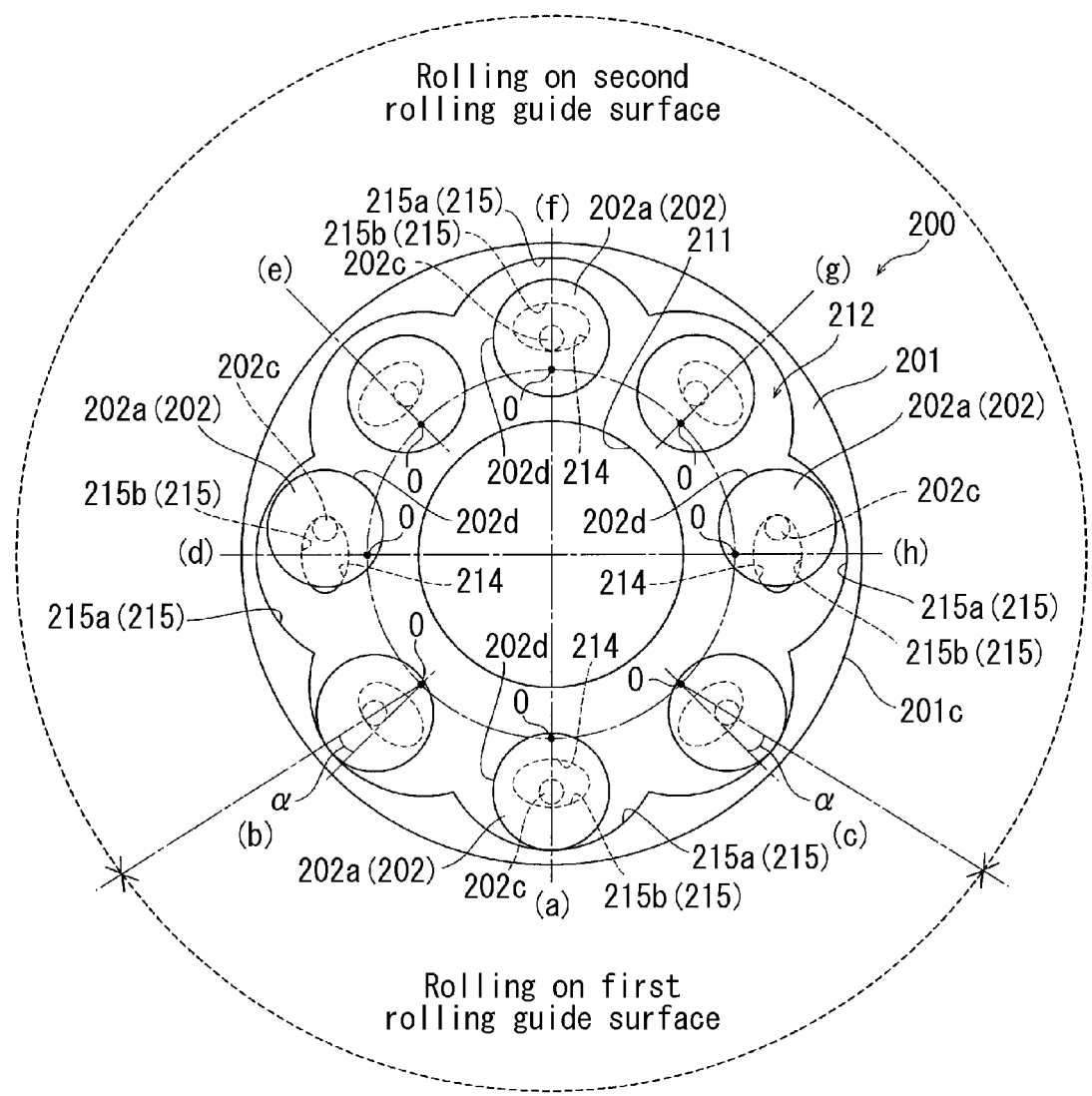
FIG. 12 is a schematic view for explaining a rolling locus of a mass member of the torque fluctuation absorbing apparatus according to the second embodiment disclosed here.

As illustrated in FIGS. 10 to 12, the torque fluctuation absorbing apparatus 200 according to the second embodiment includes a plate member 201 which is formed in a disc shape with hollow (donut shape) and mounted to the crankshaft 120a (see FIG. 1) via the damper 130 (see FIG. 1), and plural mass members 202.

Figure 13:
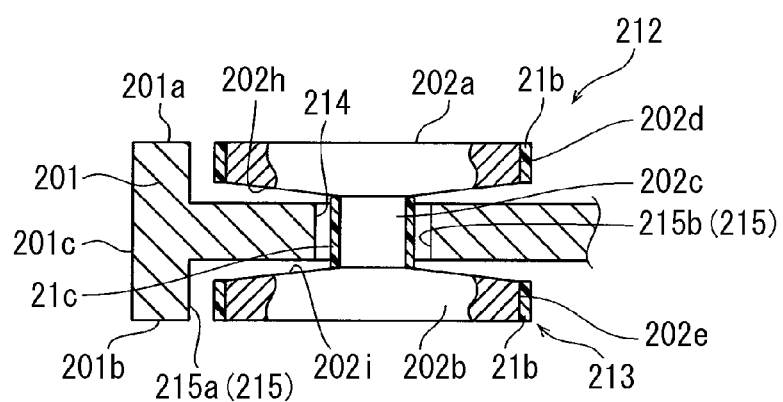
FIG. 13 is a partial cross-sectional view showing surroundings of the mass member of the torque fluctuation absorbing apparatus according to the second embodiment disclosed here.

The plate member 201 made from a metal member formed in a plate shape includes a hollow portion 211 formed in a disc shape penetrating through in a plate thickness direction. Further, as illustrated in FIGS. 10, 11, and 13, a first recessed portion 212 (i.e., serving as a recessed portion) including an inner side surface configuration in which plural arcs are continuously arranged in a circumferential direction is formed at a first surface 201a of the plate member 201. Similarly, a second recessed portion 213 (i.e., serving as a recessed portion) including an inner side surface configuration in which plural arcs are continuously arranged in a circumferential direction is formed at a second surface 201b of the plate member 201. The first recessed portion 212 and the second recessed portion 213 serve as examples of a recessed portion. Further, as illustrated in FIGS. 11 to 13, the plate member 201 includes plural elliptical rolling guide hole 214 which penetrated through in a plate thickness direction. Further, the plate member 201 includes a rolling guide surface 215 for guiding the mass member 202 to roll. The rolling guide surface 215 includes plural arc shaped first rolling guide surfaces 215a which are configured with an inner surface of the first recessed portion 212 (second recessed portion 213) and plural elliptical second rolling guide surfaces 215b configured with an inner surface of the plural rolling guide holes 214.

The plural first rolling guide surfaces 215a are provided in a circumferential direction at radially inward relative to an outer peripheral portion 201c of the plate member 201 so that the mass member 202 rolls thereon. Further, the plural first rolling guide surfaces 215a are formed in an arc shape protruding radially outward of the plate member 201. Still further, the second rolling guide surface 215b is provided separately from the first rolling guide surface 215a and is formed so that the mass member 202 rolls thereon on a locus which is different from a locus on the arc shaped first rolling guide surface 215a. In those circumstances, the second rolling guide surface 215b guides the mass member 202 to roll while restricting the motion of the mass member 202 towards radially inward (towards inner circumference) of the plate member 201. More particularly, the second rolling guide surface 215b is formed in a manner that the mass member 202 rolls thereon with a turning radius smaller than a turning radius on the arc shaped first rolling guide surface 215a. Further, the elliptical second rolling guide surface 215b is formed to be elongated in a circumferential direction of the plate member 201 and is formed to be shorter in a radial direction of the plate member 201. That is, the elliptical second rolling guide surface 215b is arranged so that a semi-minor axis is positioned along a radial direction of the plate member 201 and a semi-major axis is positioned along a direction perpendicular to the radial direction of the plate member 201.

As illustrated in FIGS. 11 and 13, the mass member 202 includes a disc shaped first mass member portion 202a positioned at the first surface 201a of the plate member 201, a disc shaped second mass member portion 202b positioned at the second surface 201b of the plate member 201, and a rolling shaft portion 202c connecting the first mass member portion 202a and the second mass member portion 202b. The first mass member portion 202a and the second mass member portion 202b serve as a first mass member and a second mass member, respectively.

Figure 14:
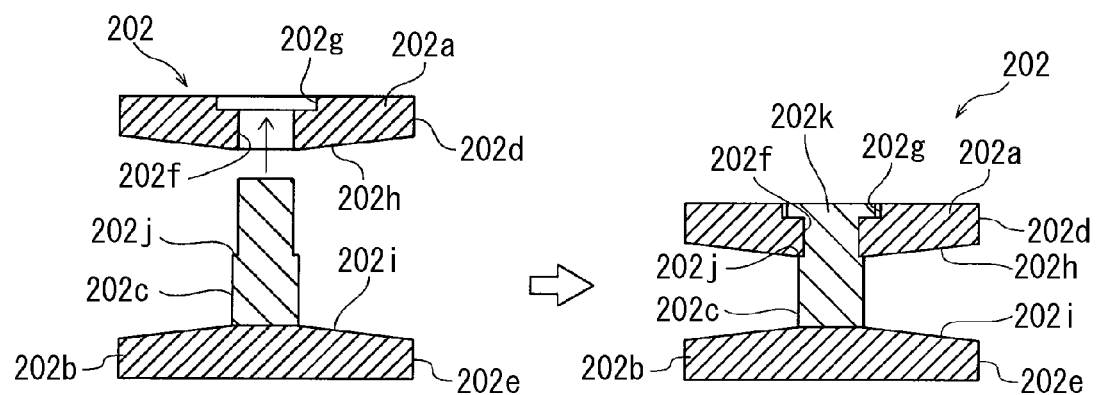
FIG. 14 is a schematic cross-sectional view showing a structure of the mass member of the torque fluctuation absorbing apparatus according to the second embodiment disclosed here.

The first mass member portion 202a and the second mass member portion 202b are made of metal. The first mass member portion 202a is positioned inside the first recessed portion 212 of the plate member 201 and includes a first outer periphery rolling portion 202d rolling on the first rolling guide surface 215a of the first recessed portion 212. Further, the second mass member portion 202b is positioned inside the second recessed portion 213 of the plate member 201 and includes a second outer periphery rolling portion 202e rolling on the first rolling guide surface 215a of the second recessed portion 213. The first outer periphery rolling portion 202d and the second outer periphery rolling portion 202e are formed in the same configuration (i.e., circumference length and thickness are the same). The first outer periphery rolling portion 202d and the second outer periphery rolling portion 202e serve as examples of an outer periphery rolling portion. Further, as illustrated in FIGS. 11 and 14, the first mass member portion 202a is formed with a through hole 202f in which the rolling shaft portion 202c is inserted. Still further, as illustrated in FIG. 14, an enlarged diameter portion 202g whose inner diameter is enlarged is formed at an end portion of the through hole 202f positioned at a side opposite from a side where the second mass member portion 202b is positioned.

As illustrated in FIGS. 13 and 14, a portion of the first mass member portion 202a (second mass member portion 202b) which faces the plate member 201 may be formed in a flat shape, however, in order to reduce a resistance when rolling, a tapered portion 202h (tapered portion 202i) protruding towards the plate member 201 is formed. The tapered portion 202h (tapered portion 202i) is formed in a frustum of cone, or circular truncated cone. As illustrated in FIG. 13, an anti-skid member 21b is attached to the first outer periphery rolling portion 202d (second outer periphery rolling portion 202e) of the first mass member portion 202a (second mass member portion 202b) for covering an outer periphery of the first mass member portion 202a (second mass member portion 202b).

The anti-skid member 21b made of resin (e.g., Nylon 6 or polycaprolactam (PA6), Nylon 66 (PA66)) is provided to restrain the first mass member portion 202a (second mass member portion 202b) from slipping relative to the first rolling guide surface 215a. Further, a surface of the first mass member portion 202a (second mass member portion 202b) at a side opposite from the side facing the plate member 201 is formed to be flush with the first surface 201a (second surface 201b) of the plate member 201 in a state where the first mass member portion 202a (second mass member portion 202b) is positioned at the first recessed portion 212 (second recessed portion 213).

The rolling shaft portion 202c made of metal is fixedly provided at the second mass member portion 202b as illustrated in FIGS. 11 to 14. Further, the rolling shaft portion 202c includes a smaller diameter compared to a diameter of the first outer periphery rolling portion 202d (second outer periphery rolling portion 202e). Further, the rolling shaft portion 202c is configured to roll on the elliptical second rolling guide surface 215b formed by an inner surface of the rolling guide hole 214 in a state where the rolling shaft portion 202c is positioned in the rolling guide hole 214 of the plate member 201 when the torsional vibration of the crankshaft 120a is assumed to be equal to or greater than a predetermined level. Further, as illustrated in FIG. 14, a stepped portion 202j whose diameter is smaller is formed at the rolling shaft portion 202c so that a diameter of the rolling shaft portion 202c at a tip end portion is assumed to be smaller than a diameter at a base portion.

Further, the rolling shaft portion 202c is constructed to form a clinching portion 202k by clinching a tip end portion of the rolling shaft portion 202c in a state where the rolling shaft portion 202c is positioned in the through hole 202f of the first mass member portion 202a. More particularly, the clinching portion 202k is formed by inserting the rolling shaft portion 202c into the through hole 202f of the first mass member portion 202a positioned at the first surface 201a of the plate member 201 and by clinch processing in a state where the rolling shaft portion 202c is inserted from the second surface 201b side of the plate member 201 to be positioned in the rolling guide hole 214 (see FIG. 13). Accordingly, the first mass member portion 202a and the second mass member portion 202b are fixedly connected by the rolling shaft portion 202c positioned at the rolling guide hole 214 in a state where the first mass member portion 202a and the second mass member portion 202b are arranged at the side of the first surface 201a of the plate member 201 and at the side of the second surface 201b of the plate member 201, respectively. Further, upon a contact of the first mass member portion 202a to the stepped portion 202j of the rolling shaft portion 202c, the first mass member portion 202a and the second mass member portion 202b are connected by the rolling shaft portion 202c while keeping a predetermined distance from one another. The predetermined distance between the first mass member portion 202a and the second mass member portion 202b is slightly longer than a plate thickness of a portion of the plate member 201 corresponding to a distance between the bottom surfaces of the first recessed portion 212 and the second recessed portion 213. Further, the clinching portion 202k of the rolling shaft portion 202c is housed within the enlarged diameter portion 202g of the first mass member portion 202a to be flush with the first mass member portion 202a.

As illustrated in FIG. 13, a noise reduction member 21c made of resin (e.g., Nylon 6 or polycaprolactam (PA6), Nylon 66 (PA66)) is attached to the rolling shaft portion 202c to cover the outer periphery of the rolling shaft portion 202c.

The noise reduction member 21c is provided to reduce the generation of the noise because of a collision of the rolling shaft portion 202c and the second rolling guide surface 215b in a case where the mass member 202 falls (moves) radially inward of the plate member 201 by self-weight when the centrifugal force towards the radially outer side of the plate member 201 is reduced due to lower rotation speed of the crankshaft 120a.

With the foregoing construction, the torque fluctuation absorbing apparatus 200 according to the second embodiment is configured to absorb the torsional vibration with the predetermined order of the crankshaft 120a by rolling the plural mass members 202 on the first rolling guide surface 215a of the plate member 201 in a pendular manner to resonate. Further, when the torsional vibration of the crankshaft 120a is assumed to be equal to or greater than the predetermined level, the loci of the mass member 202 is continuously, or seamlessly switched from a locus in which the mass member 202 rolls on the first rolling guide surface 215a to a locus in which the mass member 202 rolls on the second rolling guide surface 215b. Further, the torque fluctuation absorbing apparatus 200 is configured to further switch loci of the mass member 202 seamlessly, or continuously from the locus in which the mass member 202 rolls on the second rolling guide surface 215b to the locus in which the mass member 202 rolls on the first rolling guide surface 215a after seamlessly, or continuously switching the loci of the mass member 202 from the locus in which the mass member 202 rolls on the first rolling guide surface 215a to the locus in which the mass member 202 rolls on the second rolling guide surface 215b.

A rolling locus of the mass member 202 of the torque fluctuation absorbing apparatus 200 according to the second embodiment will be explained hereinafter with reference to FIG. 12.

When the level of the torsional vibration of the crankshaft 120a is lower than a predetermined level, the first outer periphery rolling portion 202d (second outer periphery rolling portion 202e (see FIG. 13)) rolls in a pendular manner along the first rolling guide surface 215a in a state where the first mass member portion 202a (second mass member portion 202b (see FIG. 13)) of the mass member 202 is positioned at the first recessed portion 212 (second recessed portion 213) of the plate member 201. More particularly, when the level of the torsional vibration of the crankshaft 120a is lower than the predetermined level, the mass member 202 rolls along the first rolling guide surface 215a in a pendular manner within a range between a position indicated with (b) in FIG. 12 at which the mass member 202 is moved by a predetermined angle α (e.g., 30 degrees) in a clockwise direction from a position indicated with (a) in FIG. 12 where the mass member 202 is positioned at an outermost position in a radial direction of the plate member 201 and a position indicated with (c) in FIG. 12 at which the mass member 202 is moved by a predetermined angle α (e.g., 30 degrees) in a counterclockwise direction (i.e., predetermined angle −α) from the position indicated with (a) in FIG. 12. That is, when the level of the torsional vibration of the crankshaft 120a is lower than the predetermined level, the mass member 202 rolls along the first rolling guide surface 215a in a pendular manner within the range between the position indicated with (b) and the position indicated with (c) in FIG. 12 with the position indicated with (a) as a substantial center. In those circumstances, the mass member 202 absorbs the torsional vibration with the predetermined order of the crankshaft 120a by rolling in a pendular manner without the rolling shaft portion 202c contacting the second rolling guide surface 215b formed at an inner surface of the rolling guide hole 214 of the plate member 201. The foregoing predetermined angle (predetermined angles α, −α, corresponding to, for example, 30 degrees, −30 degrees) corresponds to a rotation angle (moving angle) of the mass member 202 in a case where a center O of the arc shaped first rolling guide surface 215a is defined as a reference.

On the other hand, when the torsional vibration of the crankshaft 120a is assumed to be equal to or greater than the predetermined level, the rolling shaft portion 202c of the mass member 202 rolls along the inner surface of the rolling guide hole 214 which structures the second rolling guide surface 215b. More particularly, when the torsional vibration of the crankshaft 120a is assumed to be equal to or greater than the predetermined level, the rolling range of the mass member 202 increases to move in a clockwise direction exceeding a position which is a predetermined angle α (i.e., position (b) in FIG. 12) from the position (a) shown in FIG. 12. In those circumstances, the rolling loci of the mass member 202 continuously, or seamlessly switch from a locus in which the first outer periphery rolling portion 202d (second outer periphery rolling portion 202e (see FIG. 13)) rolls on the first rolling guide surface 215a to a locus in which the rolling shaft portion 202c rolls on the second rolling guide surface 215b. Then, by the rolling motion of the rolling shaft portion 202c rolling along the second rolling guide surface 215b, the mass member 202 reaches the position (c) via the positions (d), (e), (f), (g), and (h) in the mentioned order in the clockwise direction from the position (b) in FIG. 12. After passing the position (b) in FIG. 12 until reaching the position (c), the mass member 202 rolls without the first outer periphery rolling portion 202d (second outer periphery rolling portion 202e (see FIG. 13)) contacting the first rolling guide surface 215a. In those circumstances, the mass member 202 rolls on a locus with smaller turning radius by the second rolling guide surface 215b compared to on a locus when rolling on the arc shaped first rolling guide surface 215a.

Thereafter, the rolling loci of the mass member 202 continuously, or seamlessly switch from the locus in which the rolling shaft portion 202c rolls on the second rolling guide surface 215b to the locus in which the first outer periphery rolling portion 202d (second outer periphery rolling portion 202e (see FIG. 13)) rolls on the first rolling guide surface 125a at the position (c) in FIG. 12. Then, until the torsional vibration of the crankshaft 120a is assumed to be less than the predetermined level, the loci are repeatedly switched between the locus in which the mass member 202 rolls on the first rolling guide surface 215a and the locus in which the mass member 202 rolls on the second rolling guide surface 215b. Depending on the direction of the torsional vibration of the crankshaft 120a, the mass member 202 may exceed the position which is predetermined angle α in counterclockwise direction (i.e., predetermined angle −α) (i.e., position (c) in FIG. 12) from the position (a) in FIG. 12 to reach the position (b) via the positions (h), (g), (f), (e), and (d) in the mentioned order in the counterclockwise direction in FIG. 12. Even in those circumstances, the rolling loci of the mass member 202 switch seamlessly, or continuously.

Other constructions of the second embodiment are common to the first embodiment.

According to the second embodiment, as described above, the second rolling guide surface 215b is formed so that the mass member 202 rolls on the second rolling guide surface 215b with smaller turning radius compared to a case where the mass member 202 rolls on the arc shaped first rolling guide surface 215a. Thus, when the torsional vibration of the crankshaft 120a is assumed to be equal to or greater than the predetermined level, the rolling loci of the mass member 202 can be seamlessly, or continuously switched from the locus in which the mass member 202 rolls on the first rolling guide surface 215a to the locus in which the mass member 202 rolls on the second rolling guide surface 215b with smaller turning radius compared to on the first rolling guide surface 215a, thus, the mass member 202 rolls with smaller turning radius when the mass member 202 moves radially inward of the plate member 201. Accordingly, an increase of the moving range of the mass member 202 in the radial direction of the plate member 201 can be effectively restrained.

Further, according to the second embodiment, as described above, the mass member 202 is provided with the first outer periphery rolling portion 202d (second outer periphery rolling portion 202e) rolling on the first rolling guide surface 215a of the plate member 201, and the rolling shaft portion 202c having an outer diameter smaller than an outer diameter of the first outer periphery rolling portion 202d (second outer periphery rolling portion 202e) of the mass member 202 and rolling on the second rolling guide surface 215b. Accordingly, when the torsional vibration of the crankshaft 120a is assumed to be equal to or greater than the predetermined level, the rolling loci of the mass member 202 switch from the locus in which the first outer periphery rolling portion 202d (second outer periphery rolling portion 202e) rolls on the first rolling guide surface 215a to the locus in which the rolling shaft portion 202c having the smaller outer diameter than the first outer periphery rolling portion 202d (second outer periphery rolling portion 202e) rolls on the second rolling guide surface 215b with smaller turning radius compared to on the first rolling guide surface 215a, thus, the mass member 202 can be rolled readily with smaller turning radius when the mass member 202 moves radially inward of the plate member 201.

Further, according to the second embodiment, as described above, the second rolling guide surface 215b is formed by the inner surface of the rolling guide hole 214 provided penetrating through the plate member 201, and the first mass member portion 202a and the second mass member portion 202b are connected by the rolling shaft portion 202c positioned in the rolling guide hole 214 in a state where the first mass member portion 202a and the second mass member portion 202b are positioned at the first side and the second side of the plate member 201, respectively. Accordingly, when the torsional vibration of the crankshaft 120a is assumed to be equal to or greater than the predetermined level, the rolling shaft portion 202c of the mass member 202 can be readily rolled along the second rolling guide surface 215b formed by the inner surface of the rolling guide hole 214 of the plate member 201.

Further, according to the second embodiment, as described above, the first mass member portion 202a (second mass member portion 202b) is constructed so that the first outer periphery rolling portion 202d (second outer periphery rolling portion 202e) rolls along the first rolling guide surface 215a in a state where the first mass member portion 202a (second mass member portion 202b) is positioned in the first recessed portion 212 (second recessed portion 213), and when the torsional vibration of the crankshaft 210a is assumed to be equal to or greater than the predetermined level, the rolling shaft portion 202c rolls along the inner surface of the rolling guide hole 214 constructing the second rolling guide surface 215b. Thus, when the torsional vibration of the crankshaft 120a is assumed to be equal to or greater than the predetermined level, the rolling loci of the mass member 202 can be continuously, or seamlessly transited from the locus in which the first outer periphery rolling portion 202d (second outer periphery rolling portion 202e) of the first mass member portion 202a (second mass member portion 202b) rolls on the first rolling guide surface 215a of the first recessed portion 212 (second recessed portion 213) to the locus in which the rolling shaft portion 202c rolls on the second rolling guide surface 215b constructed by the inner surface of the rolling guide hole 214.

According to the second embodiment, as described above, the second rolling guide surface 215b on which the rolling shaft portion 202c of the mass member 202 rolls is formed in an elliptical shape which is shorter in a radial direction and longer in a circumferential direction of the plate member 201. Thus, because the second rolling guide surface 215b can be defined to be shorter in the radial direction of the plate member 201, the large motion of the mass member 202 in a radially inward direction of the plate member 201 can be more effectively restrained in a case where the torsional vibration of the crankshaft 120a is assumed to be equal to or greater than the predetermined level.

Further, according to the second embodiment, as described above, the tapered portion 202h (tapered portion 202i) is formed on the mass member 202 at the portion where the first mass member portion 202a (second mass member portion 202b) and the plate member 201 face each other. Thus, because dimensions of an area of contact of the first mass member portion 202a (second mass member portion 202b) of the mass member 202 and the plate member 201 is reduced, hysteresis loss because of the sliding resistance between the first mass member portion 202a (second mass member portion 202b) of the mass member 202 and the plate member 201 can be reduced.

Further, according to the construction of the second embodiment, similar to the first embodiment, because the rolling loci of the mass member 202 can be smoothly transited from the locus in which the mass member 202 rolls on the first rolling guide surface 215a to the locus in which the mass member 202 rolls on the second rolling guide surface 215b by configuring to continuously, or seamlessly switch the rolling loci of the mass member 202 from the locus in which the mass member 202 rolls on the arc shaped first rolling guide surface 215a to the locus in which the mass member 202 rolls on the second rolling guide surface 215b whose locus is different from the locus of the mass member 202 rolling on the first rolling guide surface 215a when the torsional vibration of the crankshaft 120a is assumed to be equal to or greater than the predetermined level, the generation of the noise due to the collision of the mass member 202 can be restrained even when the torsional vibration of the crankshaft 120a is assumed to be equal to or greater than the predetermined level.

Other effects and advantages of the second embodiment are the same with those of the first embodiment.

First to tenth modified examples of the second embodiment will be explained as follows. According to the second embodiment, as illustrated in FIG. 13, the tapered portion 202h (tapered portion 202i) protruding towards the plate member 201 is formed on the first mass member portion 202a (second mass member portion 202b). Alternatively, constructions according to the first to fifth modified examples of the second embodiment illustrated in FIGS. 15A to 15E may be applied.

Figure 15A:
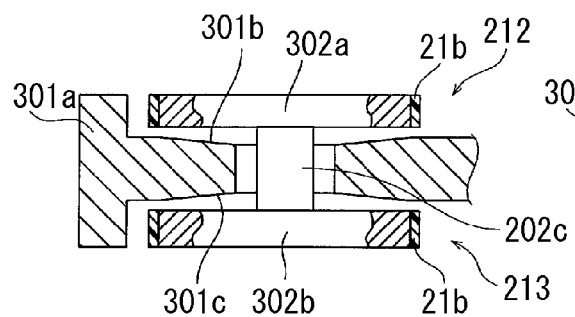
FIG. 15A shows a first modified example of the second embodiment disclosed here.
Figure 15B:
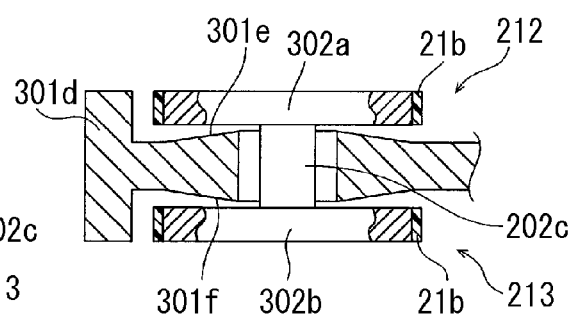
FIG. 15B shows a second modified example of the second embodiment disclosed here.
Figure 15C:
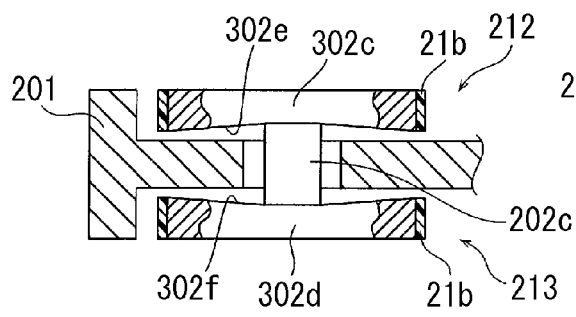
FIG. 15C shows a third modified example of the second embodiment disclosed here.
Figure 15D:
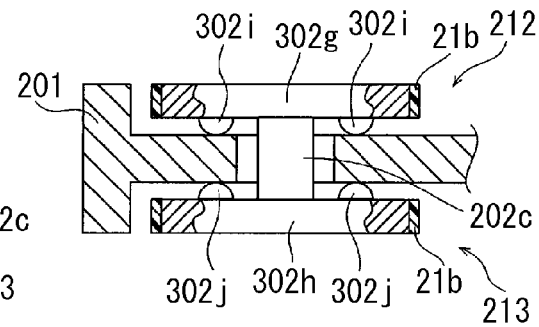
FIG. 15D shows a fourth modified example of the second embodiment disclosed here.
Figure 15E:
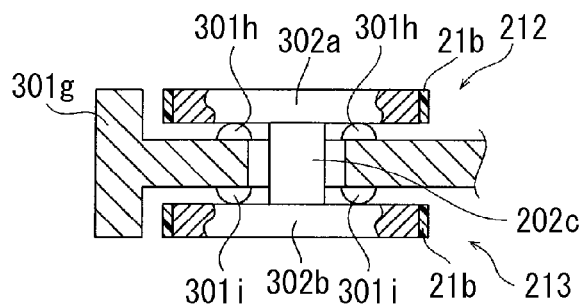
FIG. 15E shows a fifth modified example of the second embodiment disclosed here.

More particularly, according to the first modified example shown in FIG. 15A, a tapered portion 301b (tapered portion 301c) which is recessed in a frustum of cone shape, or in a circular truncated cone shape is formed on the plate member 301a at a portion facing the first mass member portion 302a (second mass member portion 302b). Further, according to the second modified example illustrated in FIG. 15B, a tapered portion 301e (tapered portion 301f) protruding towards the first mass member portion 302a (second mass member portion 302b) in a frustum of cone shape, or in a circular truncated cone shape is formed on the plate member 301d at a portion facing the first mass member portion 302a (second mass member portion 302b). Further, according to the third modified example illustrated in FIG. 15C, a tapered portion 302e (tapered portion 302f) recessed in a frustum of cone shape, or in a circular truncated cone shape is formed on the first mass member portion 302c (second mass member portion 302d) at a portion facing the plate member 201. Still further, according to the fourth modified example illustrated in FIG. 15D, a protrusion portion 302i (protrusion portion 302j) protruding towards the plate member 201 is formed on the first mass member portion 302g (second mass member portion 302h) at a portion facing the plate member 201, the protrusion portion 302i (protrusion portion 302j) is formed at the position close to the rolling shaft portion 202c. Further, according to the fifth modified example illustrated in FIG. 15E, a protrusion portion 301h (protrusion portion 301i) protruding towards the first mass member portion 302a (second mass member portion 302b) is formed on the plate member 301g at a portion facing the first mass member portion 302a (second mass member portion 302b). The first mass member portion 302a, 302c, 302g serves as an example of a first mass member. The second mass member portion 302b, 302d, 302h serves as an example of a second mass member.

Further, according to the second embodiment, the rolling guide hole 214 structuring the second rolling guide surface 215b is formed in an elliptical configuration. Alternatively, constructions disclosed in the sixth to ninth modified examples of the second embodiment illustrated in FIGS. 16A to 16D may be applied.

Figure 16A:
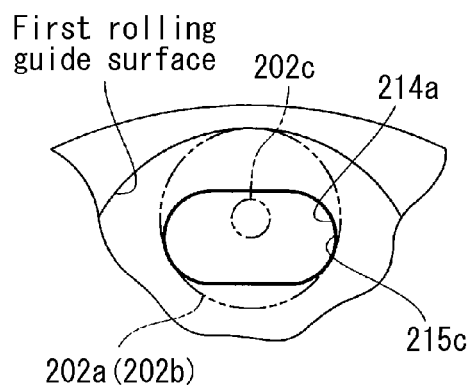
FIG. 16A shows a sixth modified example of the second embodiment disclosed here.
Figure 16B:
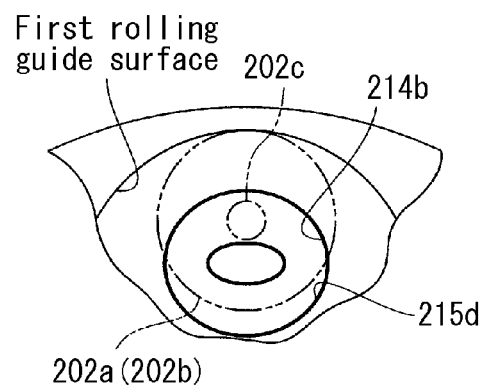
FIG. 16B shows a seventh modified example of the second embodiment disclosed here.
Figure 16C:
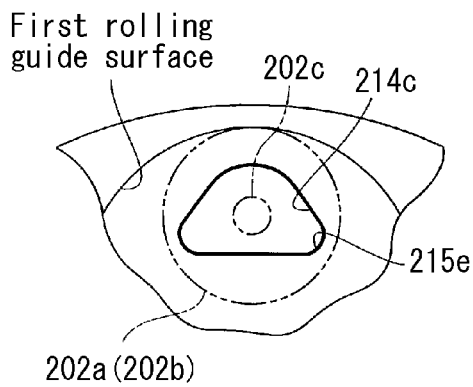
FIG. 16C shows an eighth modified example of the second embodiment disclosed here.
Figure 16D:
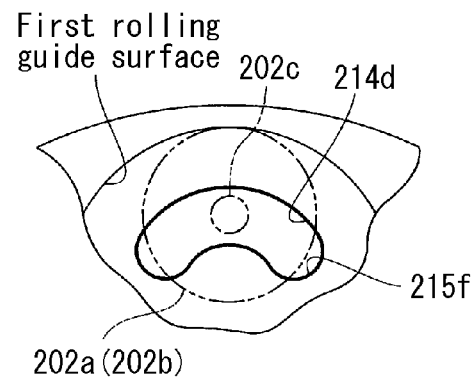
FIG. 16D shows a ninth modified example of the second embodiment disclosed here.

Particularly, according to the sixth modified example illustrated in FIG. 16A, by forming a rolling guide hole 214a in an oblong, or oval shape (track shape), a second rolling guide surface 215c structured with an inner surface of the rolling guide hole 214a is formed in an oblong, or oval shape (track shape). Further, according to the seventh modified example illustrated in FIG. 16B, by forming a rolling guide hole 214b in a circular, or ring shape (donut shape), a second rolling guide surface 215d structured by an inner surface of the rolling guide hole 214b is formed in an elliptical configuration. Further, according to the eighth modified example illustrated in FIG. 16C, by forming the rolling guide hole 214c in a substantially triangular shape (mountain like configuration), the second rolling guide surface 215e structured with an inner surface of the rolling guide hole 214c is formed in a substantially triangular shape (mountain like shape). Still further, according to the ninth modified example illustrated in FIG. 16D, by forming an inner surface of a rolling guide hole 214d in a heart like shape (curved oblong shape), a second rolling guide surface 215f formed by the inner surface of a rolling guide hole 214d is formed in a heart like shape (curved oblong shape).

Figure 17:
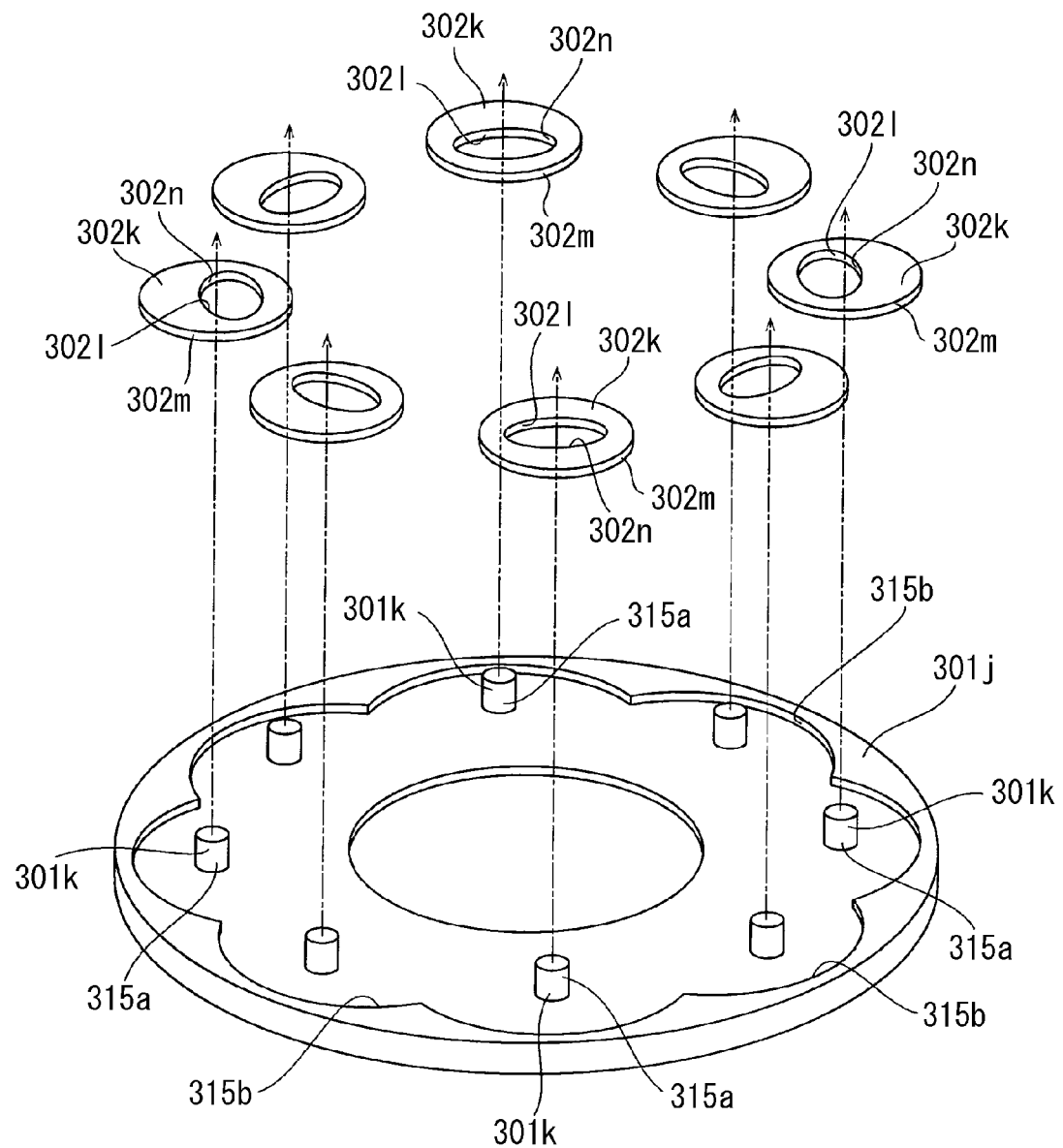
FIG. 17 shows a tenth modified example of the second embodiment disclosed here.

According to the second embodiment, the second rolling guide surface 215b structured with an inner surface of the rolling guide hole 214 of the plate member 201 is provided. Alternatively, according to the tenth modified example of the second embodiment as illustrated in FIG. 17, plural protrusion portions 301k formed in columnar shape are formed on a plate member 301j, and a second rolling guide surface 315a (i.e., serving as a rolling guide surface) is structured with an outer peripheral surface of the protrusion portion 301k. In those circumstances, a mass member 302k is formed with a through hole 302l formed in an elliptical shape to which the protrusion portion 301k can be inserted. Then, when the torsional vibration of the power transmission system is assumed to be equal to or greater than the predetermined level, rolling loci of the mass member 302k is continuously, or seamlessly switched from a locus in which an outer periphery rolling portion 302m of the mass member 302k rolls on a first rolling guide surface 315b (i.e., serving as a rolling guide surface) of the plate member 301j to a locus in which an inner surface rolling portion 302n structured with an inner surface of the through hole 302l of the mass member 302k rolls on the second rolling guide surface 315a structured with an outer periphery surface of the protrusion portion 301k of the plate member 301j.

The disclosed embodiments are mere examples and are not limited thereto.

For example, according to the first embodiment, the annular connection members 3 serving as a pair for connecting the plural mass members 2 is disclosed, however, the construction is not limited. Alternatively, only single annular connection member may be provided.

Further, according to the first embodiment, the protrusion portion 221 (first engagement portion) is provided at the mass member 2 and the hole portion 31 (second engagement portion) to which the protrusion portion 221 engages is provided at the connection member 3, however, the construction is not limited. Alternatively, a hole portion may be provided at a mass member, and a protrusion portion which engages with the hole portion may be provided at a connection member.

According to the second embodiment, the first mass member portion 202a (first mass member) and the second mass member portion 202b (second mass member) are provided at the mass member 202, however, the construction is not limited. Alternatively, only one of a first mass member portion (first mass member) and a second mass member portion (second mass member) may be provided at a mass member. In those circumstances, a recessed portion having a first rolling guide surface may be provided at only one of a first surface and a second surface of a plate member.

Further, according to first and second embodiments, the torque fluctuation absorbing apparatus is structured to absorb a torsional vibration of the crankshaft of the engine, however, the construction is not limited. Alternatively, a torque fluctuation absorbing apparatus may be constructed to absorb a torsional vibration of a power transmission system other than a crankshaft in response to a torque fluctuation of an engine.

Further, according to the first and second embodiments, the anti-skid member is provided to cover the outer periphery of the mass member, however, the construction is not limited. Alternatively, an anti-skid member may be provided at a rolling guide surface on which a mass member rolls without providing the anti-skid member onto the mass member. Further, alternatively, an anti-skid member may be provided at the both of a mass member and a rolling guide surface on which the mass member rolls.

Further, according to the first and second embodiments, the anti-skid member is made of resin, however, the construction is not limited. Alternatively, an anti-skid member may be made of material other than the resin, for example, the anti-skid member may be made from a rubber member.

According to the construction of the embodiment, the torque fluctuation absorbing apparatus absorbing the torsional vibration of the power transmission system (crankshaft 120a) in response to a torque fluctuation of an engine includes the plate member (1, 101a, 101b, 101c, 201, 301a, 301d, 301g, 301j) configured to be provided at the power transmission system (120a) and including the rolling guide surface (121, 215, 315a, 315b), and the mass member (2, 202, 302k) rolling on the rolling guide surface (121, 215, 315b) of the plate member (1, 101a, 101b, 101c, 201, 301a, 301d, 301g, 301*j*). The rolling guide surface (121, 215, 315*b*) includes plural first rolling guide surfaces (121*a*, 215*a*, 315*b*) each formed in an arc shape and provided radially inward relative to an outer circumferential portion of the plate member (1, 101*a*, 101*b*, 101*c*, 201, 301*a*, 301*d*, 301*g*, 301*j*) to be arranged in a circumferential direction and the second rolling guide surface (121*b*, 121*d*, 215*b*, 215*c*, 215*d*, 215*e*, 215*f*, 315*a*) allowing the mass member (2, 202, 302*k*) to roll on a locus which is different from a locus on the first rolling guide surface (121*a*, 215*a*, 315*b*) formed in the arc shape. Loci of the mass member (2, 202, 302*k*) are seamlessly switched from the locus in which the mass member (2, 202, 302*k*) rolls on the first rolling guide surface (121*a*, 215*a*, 315*b*) to the locus in which the mass member (2, 202, 302*k*) rolls on the second rolling guide surface (121*b*, 121*d*, 215*b*, 215*c*, 215*d*, 215*e*, 215*f*, 315*a*)

According to the torque fluctuation absorbing apparatus of the embodiment, when the torsional vibration of the power transmission system (crankshaft 120*a*) is assumed to be equal to or greater than the predetermined level, loci of the mass member (2, 202, 302*k*) are seamlessly switched from the locus in which the mass member (2, 202, 302*k*) rolls on the arc shaped first rolling guide surface (121*a*, 215*a*, 315*b*) to the locus, in which the mass member (2, 202, 302*k*) rolls on the second rolling guide surface (121*b*, 121*d*, 215*b*, 215*c*, 215*d*, 215*e*, 215*f*, 315*a*), which is different from the first rolling guide surface (121*a*, 215*a*, 315*b*) to allow smooth transition of the rolling locus of the mass member (2, 202, 302*k*) from the locus in which the mass member (2, 202, 302*k*) rolls on the first rolling guide surface (121*a*, 215*a*, 315*b*) to the locus in which the mass member (2, 202, 302*k*) rolls on the second rolling guide surface (121*b*, 121*d*, 215*b*, 215*c*, 215*d*, 215*e*, 215*f*, 315*a*). Thus, even when the torsional vibration of the power transmission system (crankshaft 120*a*) is assumed to be equal to or greater than the predetermined level, the mass member (2, 202, 302*k*) does not come to collide with an end portion of the rolling guide surface and a stopper member which restricts a moving range of the mass member (2, 202, 302*k*). Accordingly, even when the torsional vibration of the power transmission system (crankshaft 120*a*) is assumed to be equal to or greater than the predetermined level, generation of noise because of collisions of the mass member (2, 202, 302*k*) can be restrained.

According to the construction of the embodiment, the loci of the mass member (2, 202, 302*k*) are further seamlessly switched from the locus in which the mass member (2, 202, 302*k*) rolls on the second rolling guide surface (121*b*, 121*d*, 215*b*, 215*c*, 215*d*, 215*e*, 215*f*, 315*a*) to the locus in which the mass member (2, 202, 302*k*) rolls on the first rolling guide surface (121*a*, 215*a*, 315*b*) after seamlessly switching from the locus in which the mass member (2, 202, 302*k*) rolls on the first rolling guide surface (121*a*, 215*a*, 315*b*) to the locus in which the mass member (2, 202, 302*k*) rolls on the second rolling guide surface (121*b*, 121*d*, 215*b*, 215*c*, 215*d*, 215*e*, 215*f*, 315*a*).

According to the construction of the embodiment, in addition to seamlessly switching the loci of the mass member (2, 202, 302*k*) from the locus in which the mass member (2, 202, 302*k*) rolls on the first rolling guide surface (121*a*, 215*a*, 315*b*) to the locus in which the mass member (2, 202, 302*k*) rolls on the second rolling guide surface (121*b*, 121*d*, 215*b*, 215*c*, 215*d*, 215*e*, 215*f*, 315*a*), because the loci of the mass member (2, 202, 302*k*) is seamlessly switched from the locus in which the mass member (2, 202, 302*k*) rolls on the second rolling guide surface (121*b*, 121*d*, 215*b*, 215*c*, 215*d*, 215*e*, 215*f*, 315*a*) to the locus in which the mass member (2, 202, 302*k*) rolls on the first rolling guide surface (121*a*, 215*a*, 315*b*), the rolling locus of the mass member (2, 202, 302*k*) can be smoothly transited in either cases where the rolling loci of the mass member (2, 202, 302*k*) are switched from the locus in which the mass member (2, 202, 302*k*) rolls on the first rolling guide surface (121*a*, 215*a*, 315*b*) to the locus in which the mass member (2, 202, 302*k*) rolls on the second rolling guide surface, and where the rolling loci of the mass member (2, 202, 302*k*) are switched from the locus in which the mass member (2, 202, 302*k*) rolls on the second rolling guide surface (121*b*, 121*d*, 215*b*, 215*c*, 215*d*, 215*e*, 215*f*, 315*a*) to the locus in which the mass member (2, 202, 302*k*) rolls on the first rolling guide surface (121*a*, 215*a*, 315*b*). In consequence, even when the torsional vibration of the power transmission system (crankshaft 120*a*) is assumed to be equal to or greater than the predetermined level, generation of the noise because of the collisions of the mass member (2, 202, 302*k*) with an end portion of the rolling guide surface and a stopper member can be further restrained. Further, because the loci can be readily returned from the locus in which the mass member (2, 202, 302*k*) rolls on the second rolling guide surface (121*b*, 121*d*, 215*b*, 215*c*, 215*d*, 215*e*, 215*f*, 315*a*) to the locus in which the mass member (2, 202, 302*k*) rolls on the first rolling guide surface (121*a*, 215*a*, 315*b*) even when the rolling loci of the mass member (2, 202, 302*k*) transit from the locus in which the mass member (2, 202, 302*k*) rolls on the first rolling guide surface (121*a*, 215*a*, 315*b*) to the locus in which the mass member (2, 202, 302*k*) rolls on the second rolling guide surface (121*b*, 121*d*, 215*b*, 215*c*, 215*d*, 215*e*, 215*f*, 315*a*) when the torsional vibration of the power transmission system (crankshaft 120*a*) is assumed to be equal to or greater than the predetermined level, the torsional vibration of the power transmission system (crankshaft 120*a*) can be absorbed by the rolling of the mass member (2, 202, 302*k*) returning to the first rolling guide surface.

According to the construction of the embodiment, the plural first rolling guide surfaces (121*a*) each formed in the arc shape of the plate member (1, 101*a*, 101*b*, 101*c*) are formed to be adjacent to one another in a circumferential direction via the second rolling guide surface (121*b*, 121*d*). The mass member (2) moves to the adjacent first rolling guide surface (121*a*) via the second rolling guide surface (121*b*, 121*d*) when a torsional vibration of the power transmission system (120*a*) is assumed to be equal to or greater than a predetermined level.

According to the construction of the embodiment, when the torsional vibration of the power transmission system (crankshaft 120*a*) is assumed to be equal to or greater than the predetermined level, the mass member (2) moves from the first rolling guide surface (121*a*) to the adjacent first rolling guide surface (121*a*) via the second rolling guide surface (121*b*, 121*d*) in a circumferential direction, thus allowing the mass member (2) to move in a circumferential direction of the plate member (1, 101*a*, 101*b*, 101*c*) while the mass member (2) being in contact with the first rolling guide surface (121*a*), the second rolling guide surface (121*b*, 121*d*), and the adjacent first rolling guide surface (121*a*). In consequence, even when the torsional vibration of the power transmission system (crankshaft 120*a*) is assumed to be equal to or greater than the predetermined level, large motion, or shift of the mass member (2) in a radially inward direction of the plate member (1, 101*a*, 101*b*, 101*c*) can be effectively restrained.

According to the construction of the embodiment, the plural first rolling guide surfaces (121*a*) include the plural arc shaped outer periphery side rolling guide surfaces (121*a*) arranged adjacent to one another in a circumferential direction at an outer periphery portion of the plate member (1, 101*a*, 101*b*, 101*c*). The second rolling guide surface (121*b*, 121*d*) is provided to connect the first rolling guide surfaces (121*a*) adjacent to each other and is configured to guide the mass member (2) to move to the adjacent outer periphery side rolling guide surface (121*a*) when the torsional vibration of the power transmission system (120*a*) is assumed to be equal to or greater than the predetermined level.

According to the construction of the embodiment, when the torsional vibration of the power transmission system (crankshaft 120*a*) is assumed to be equal to or greater than the predetermined level, the mass member (2) is guided by the second rolling guide surface (121*b*, 121*d*) to smoothly move to the first rolling guide surface (121*a*).

According to the construction of the embodiment, the plate member (1, 101*a*, 101*b*, 101*c*) includes the plural arc shaped inner circumferential side restriction surfaces (122) provided at an inner circumferential portion of the plate member (1, 101*a*, 101*b*, 101*c*) provided radially inward relative to the outer periphery side rolling guide surface (121*a*), the inner circumferential side restriction surfaces (122) arranged in a circumferential direction and restricting the mass member (2) from moving in a radially inward direction.

According to the construction of the embodiment, even when the mass member (2) falls (moves) radially inward of the plate member (1, 101*a*, 101*b*, 101*c*) by a self-weight because the centrifugal force directed towards radially outward of the plate member (1, 101*a*, 101*b*, 101*c*) is assumed to be smaller when the rotation speed of the power transmission system (crankshaft 120*a*) becomes smaller, because the inner circumferential side restriction surface (122) prevents the mass member (2) from moving in a radially inward of the plate member (1, 101*a*, 101*b*, 101*c*), an increase in a moving range of the mass member (2) can be restrained in a radial direction of the plate member (1, 101*a*, 101*b*, 101*c*).

According to the construction of the embodiment, each of the inner circumferential side restriction surfaces (122) and each of the outer periphery side rolling guide surfaces are (121*a*) shifted by a half pitch relative to each other in a circumferential direction.

According to the construction of the embodiment, because a distance in a radial direction of the plate member (1, 101*a*, 101*b*, 101*c*) between the outer periphery side rolling guide surface (121*a*) and the inner circumferential side restriction surface (122) is prevented from being partially excessively increased, a partial excessive increase of a falling distance of the mass member (2) when falling (moving) radially inward of the plate member (1, 101*a*, 101*b*, 101*c*) can be restrained. Accordingly, even when the mass member (2) falls to collide with (motion of the mass member is restricted by) the inner circumferential side restriction surface (122), a shorter falling distance reduces the noise caused by the collision.

According to the embodiment, the torque fluctuation absorbing apparatus includes the annular connection member (3, 103*a*, 103*c*, 103*e*, 103*g*) connecting the mentioned plural mass members (2) in a manner that the mass members (2) retain a predetermined distance from one another.

According to the construction of the embodiment, even when the mass member (2) moves from the first rolling guide surface (121*a*) to the adjacent first rolling guide surface (121*a*) via the second rolling guide surface (121*b*, 121*d*), because the distance between the mass members is retained by the connection member (3, 103*a*, 103*c*, 103*e*, 103*g*), collisions of the adjacent mass members (2) can be prevented. Thus, the generation of the noise by the collision of the adjacent mass members can be restrained. Further, by connecting the plural mass members (2) by means of the annular connection member (3, 103*a*, 103*c*, 103*e*, 103*g*), the plural mass members (2) arranged in a circumferential direction can be integrally connected by the single connection member (3, 103*a*, 103*c*, 103*e*, 103*g*), which restrains an increase in the number of parts compared to a construction in which separate connection members are provided between two adjacent mass members, respectively. Further, because the adjacent mass members (2) are connected in a manner that a small distance is retained, or maintained therebetween, a distance between the adjacent mass members (2) can be reduced compared to a construction without the connection member (3, 103*a*, 103*c*, 103*e*, 103*g*). Thus, the greater number of mass members can be arranged, and absorbing effects of the torsional vibration can be enhanced.

According to the construction of the embodiment, each of the mentioned plural mass members (2) includes the first engagement portion (221, 221*a*) formed with one of a protrusion portion and a hole portion, and the connection member (3, 103*a*, 103*c*, 103*e*, 103*g*) includes the plural second engagement portions (31, 131) each of which is formed with the other of the protrusion portion and the hole portion and to each of which the first engagement portion (221, 221*a*) of the mentioned plural mass members (2) engages to be movable in a radial direction of the plate member (1, 101*a*, 101*b*, 101*c*).

According to the construction of the embodiment, by a simple construction of the first engagement portion formed with the protrusion portion (221, 221*a*) (hole portion (31, 131)) and the second engagement portion formed with the hole portion (31, 131) (protrusion portion (221, 221*a*)), the distance between the mass members can be retained readily while allowing the motion of the mass member (2) in the radial direction of the plate member (1, 101*a*, 101*b*, 101*c*) when the mass member (2) rolls.

According to the construction of the embodiment, one of the connection member (3, 103*a*, 103*c*, 103*e*, 103*g*) and the plate member (1, 101*a*, 101*b*, 101*c*) is formed with the tapered portion (103*b*, 103*d*, 123*a*, 123*c*) or the protrusion portion (103*f*, 123*e*) at a portion where the connection member (3, 103*a*, 103*c*, 103*e*, 103*g*) and the plate member (1, 101*a*, 101*b*, 101*c*) face each other.

According to the construction of the embodiment, because a contact dimension of the connection member (3, 103*a*, 103*c*, 103*e*, 103*g*) and the plate member (1, 101*a*, 101*b*, 101*c*) and a contacting radius of the contact portion can be reduced, hysteresis loss due to sliding resistance between the connection member (3, 103*a*, 103*c*, 103*e*, 103*g*) and the plate member (1, 101*a*, 101*b*, 101*c*) can be reduced.

According to the construction of the embodiment, the second rolling guide surface (121*b*, 121*d*) is formed in a flat surface.

According to the construction of the embodiment, because a moving amount of the mass member (2) when moving inwardly in a radial direction against the centrifugal force when crossing, or passing the second rolling guide surface (121*b*, 121*d*) can be reduced, compared to a construction in which a second rolling guide surface protrudes inwardly in a radial direction of the plate member (1, 101*a*, 101*b*, 101*c*), the mass member (2) is more readily moved to the adjacent first rolling guide surface (121*a*) via the second rolling guide surface (121*b*, 121*d*).

According to the construction of the embodiment, the second rolling guide surface (215*b*, 215*c*, 215*d*, 215*e*, 215*f*, 315*a*) is configured to allow the mass member (202, 302*k*) to roll thereon with a smaller turning radius compared to on the arc shaped first rolling guide surface (215*a*, 315*b*).

According to the construction of the embodiment, when the torsional vibration of the power transmission system (crankshaft 120*a*) is assumed to be equal to or greater than the predetermined level, because the rolling loci of the mass member (202, 302k) can be seamlessly switched from the locus in which the mass member (202, 302k) rolls on the first rolling guide surface (215a, 315b) to the locus in which the mass member (202, 302k) rolls on the second rolling guide surface (215b, 215c, 215d, 215e, 215f, 315a) with smaller turning radius compared to on the first rolling guide surface (215a, 315b), the mass member (202, 302k) can be rolled with smaller turning radius when moving radially inward of the plate member (201, 301a, 301d, 301g, 301j). Accordingly, an increase in the moving range of the mass member (202, 302k) can be effectively restrained in a radial direction of the plate member (201, 301a, 301d, 301g, 301j).

According to the construction of the embodiment, the mass member (202, 302k) includes an outer periphery rolling portion (202e, 202d, 302m) rolling on the first rolling guide surface (215a, 315b) of the plate member (201, 301a, 301d, 301g, 301j) and a rolling shaft portion (202c) having a smaller outer diameter than the outer periphery rolling portion (202e, 202d, 302m) of the mass member (202, 302k) and rolling on the second rolling guide surface (215b, 215c, 215d, 215e, 215f, 315a).

According to the construction of the embodiment, when the torsional vibration of the power transmission system (crankshaft 120a) is assumed to be equal to or greater than the predetermined level, because the rolling loci of the mass member (202, 302k) are switched from the locus in which the outer periphery rolling portion (202e, 202d, 302m) rolls on the first rolling guide surface (215a, 315b) to the locus in which the rolling shaft portion (202c) having smaller outer diameter than the outer periphery rolling portion (202e, 202d, 302m) rolls on the second rolling guide surface (215b, 215c, 215d, 215e, 215f, 315a) on which the rolling shaft portion (202c) rolls with smaller turning radius than on the first rolling guide surface (215a, 315b), the mass member (202, 302k) can roll with smaller turning radius readily when the mass member (202, 302k) moves radially inward of the plate member (201, 301a, 301d, 301g, 301j).

According to the construction of the embodiment, the mass member (202) includes at least one of the first mass member (202a) and the second mass member (202b). The second rolling guide surface (215b, 215c, 215d, 215e, 215f) is formed with an inner surface of a rolling guide hole (214, 214a, 214b, 214c, 214d) provided penetrating through the plate member (201). The mentioned at least one of the first mass member (202a) and the second mass member (202b) is connected to the rolling shaft portion (202c) positioned in the rolling guide hole (214, 214a, 214b, 214c, 214d) in a state where one of the first mass member (202a) and the second mass member (202b) of the mentioned at least one of the first mass member (202a) and the second mass member (202b) is positioned at one of a first side and a second side of the plate member (201) or in a state where the first mass member (202a) and the second mass member (202b) are positioned at either one of the first side and the second side of the plate member (201), respectively.

According to the construction of the embodiment, when the torsional vibration of the power transmission system (crankshaft 120a) is assumed to be equal to or greater than the predetermined level, the rolling shaft portion (202c) of the mass member (202) is allowed to roll along the second rolling guide surface (215b, 215c, 215d, 215e, 215f) constructed with the inner surface of the rolling guide hole (214, 214a, 214b, 214c, 214d) of the plate member (201) readily.

According to the construction of the embodiment, the plate member (201) includes the recessed portion (212, 213) provided at at least one of the first surface (201a) and the second surface (201b) of the plate member (201) and including the first rolling guide surface (215a). The mentioned at least one of the first mass member (202a) and the second mass member (202b) includes the outer periphery rolling portion (202d, 202e), the outer periphery rolling portion (202d, 202e) of the mentioned at least one of the first mass member (202a) and the second mass member (202b) rolls along the first rolling guide surface (215a) in a state being positioned at the recessed portion (212, 213). The rolling shaft portion (202c) rolls along an inner surface of the rolling guide hole (214, 214a, 214b, 214c, 214d) forming the second rolling guide surface (215b, 215c, 215d, 215e, 215f) when the torsional vibration of the power transmission system (120a) is assumed to be equal to or greater than the predetermined level.

According to the construction of the embodiment, when the torsional vibration of the power transmission system (crankshaft 120a) is assumed to be equal to or greater than the predetermined level, the rolling loci of the mass member (202) can be seamlessly transited from the locus in which outer periphery rolling portion (202d, 202e) of at least one of the first mass member (202a) and the second mass member (202b) rolls on the first rolling guide surface (215a) of the recessed portion of the plate member (201) to the locus in which the rolling shaft portion (202c) rolls on the second rolling guide surface (215b, 215c, 215d, 215e, 215f) constructed with the inner surface of the rolling guide hole (214, 214a, 214b, 214c, 214d).

According to the construction of the embodiment, the second rolling guide surface (215b, 215c, 215d, 215e, 215f) on which the rolling shaft portion (202c) of the mass member (202) rolls is formed in a configuration shorter in a radial direction and longer in a circumferential direction of the plate member (201).

According to the construction of the embodiment, because the second rolling guide surface (215b, 215c, 215d, 215e, 215f) can be formed even shorter in a radial direction of the plate member (201), large motion of the mass member (202) in a radially inward of the plate member (201) can be effectively restrained when the torsional vibration of the power transmission system (crankshaft 120a) is assumed to be equal to or greater than the predetermined level.

According to the construction of the embodiment, one of the mass member (202) and the plate member (201) is formed with the tapered portion (202h, 202i, 301b, 301c, 301e, 301f, 302e, 302f) or the protrusion portion (301h, 301l, 302i, 302j) at a portion where the mass member (202) and the plate member (201) face each other.

According to the construction of the embodiment, because dimensions of an area of contact of the mass member (202) and the plate member (201) can be reduced, hysteresis loss because of the sliding resistance between the mass member (202) and the plate member (201) can be reduced.

According to the construction of the embodiment, the torque fluctuation absorbing apparatus includes the anti-skid member (21a, 21b) mounted to cover the outer periphery of the mass member (2, 202a, 202b, 302a, 302b, 302c, 302d, 302g, 302h).

According to the construction of the embodiment, because the mass member (2, 202) is restrained from slipping, or skidding when rolling on the first rolling guide surface (121a, 215a) by means of the anti-skid member (21a, 21b), the subject torsional vibration with predetermined order can be effectively absorbed.

According to the construction of the embodiment, generation of noise because of collision of the mass member when the torsional vibration of the power transmission system is assumed to be equal to or greater than the predetermined level can be restrained.

When the torsional vibration of the power transmission system is assumed to be equal to or greater than the predetermined level, by setting the locus in which the mass member rolls on the second rolling guide surface so as not to largely displace, or move radially inward of the plate member seamlessly, or continuously switching the loci of the mass member from the locus in which the mass member rolls on the arc shaped first rolling guide surface to the locus in which the mass member rolls on the second rolling guide surface which is different from the locus in which the mass member rolls on the first rolling guide surface, deviation, or motion of the mass member in a radially inward direction of the plate member can be restrained after the loci of the mass member are switched from the locus in which the mass member rolls on the first rolling guide surface to the locus in which the mass member rolls on the second rolling guide surface. In those circumstances, because an increase in moving range of the mass member in a radial direction of the plate member can be restrained, the torque fluctuation absorbing apparatus can be downsized by that level, in consequence, generation of noise due to the collisions of the mass member when the torsional vibration of the power transmission system is assumed to be equal to or greater than the predetermined level can be restrained while downsizing the torque fluctuation absorbing apparatus.

The torque fluctuation absorbing apparatus for absorbing torsional vibration of the power transmission system in response to torque fluctuation of the engine includes the plate member provided at the power transmission system and including the plural arc shaped rolling guide surfaces formed adjacent to one another in a circumferential direction, and the mass member rolling on the rolling guide surface of the plate member, wherein the plural arc shaped rolling guide surfaces of the plate member are configured to allow the mass member to move to the adjacent rolling guide surface when the torsional vibration of the power transmission system is assumed to be equal to or greater than the predetermined level. According to the foregoing construction, because the mass member moves from the rolling guide surface to another rolling guide surface adjacent to the rolling guide surface when the torsional vibration of the power transmission system is assumed to be equal to or greater than the predetermined level, the mass member is allowed to move in the circumferential direction of the plate member. In consequence, even when the torsional vibration of the power transmission system is assumed to be equal to or greater than the predetermined level, the mass member is restrained from largely moving in a radially inward direction of the plate member. Thus, an increase in the moving range of the mass member in a radial direction of the plate member can be restrained, which allows downsizing the torque fluctuation absorbing apparatus.

According to the torque fluctuation absorbing apparatus, the plate member includes the recessed portion which is provided at the first surface of the plate member and including the plural arc shaped rolling guide surfaces, the mass member includes the outer periphery rolling portion which is configured to roll along the rolling guide surface while being positioned in the recessed portion, and the mass member is configured to move to the adjacent rolling guide surface when the torsional vibration of the power transmission system is assumed to be equal to or greater than the predetermined level. According to the foregoing construction, when the torsional vibration of the power transmission system is assumed to be equal to or greater than the predetermined level, the mass member can be moved in a circumferential direction of the plate member readily.

The torque fluctuation absorbing apparatus further includes the annular connection member connecting the plural mass members while retaining a predetermined distance from each other. According to the foregoing construction, even when the mass member moves from the rolling guide surface to another rolling guide surface which is adjacent to the rolling guide surface in a circumferential direction, interval, or distance between the mass members can be retained by the connection member, thus, collisions of the adjacent mass members can be prevented. In consequence, generation of the noise because of the collision of the mass members can be restrained. Further, by connecting plural mass members by means of the annular connection member, the plural mass members arranged in the circumferential direction can be connected integrally with the single connection member, thus, compared to a construction in which separate connection members are provided for the adjacent mass members, respectively to connect between the adjacent mass members, an increase in the number of parts can be restrained. Further, because a state where the adjacent mass members are retained to be spaced with the constant interval, or distance, distance, or interval between the adjacent mass members can be reduced compared to a structure in which the connection member is not provided. Accordingly, because greater number of the mass member can be arranged, the torsional vibration absorbing effects can be enhanced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A torque fluctuation absorbing apparatus absorbing a torsional vibration of a power transmission system in response to a torque fluctuation of an engine, comprising:
   a plate member configured to be provided at the power transmission system and including a rolling guide surface;
   a mass member rolling on the rolling guide surface of the plate member, the mass member possessing an outer periphery;
   an anti-skid member attached to the outer periphery of the mass member;
   the rolling guide surface including a plurality of first rolling guide surfaces each formed in an arc shape and provided radially inward relative to an outer circumferential portion of the plate member to be arranged in a circumferential direction and a second rolling guide surface allowing the mass member to roll on a locus which is different from a locus on the first rolling guide surface formed in the arc shape;
   the plurality of first rolling guide surfaces formed to be adjacent to one another in a circumferential direction via the second rolling guide surface, the plurality of first rolling guide surfaces including a plurality of arc shaped outer periphery side rolling guide surfaces arranged adjacent to one another in a circumferential direction at an outer periphery portion of the plate member;
   the mass member configured to move to the adjacent first rolling guide surface via the second rolling guide surface when a torsional vibration of the power transmission system is assumed to be equal to or greater than a predetermined level;

the second rolling guide surface being provided to connect the first rolling guide surfaces adjacent to each other; the second rolling guide surface configured to guide the mass member to move to the adjacent outer periphery side rolling guide surface when the torsional vibration of the power transmission system is assumed to be equal to or greater than the predetermined level; and loci of the mass member are seamlessly switched from the locus in which the mass member rolls on the first rolling guide surface to the locus in which the mass member rolls on the second rolling guide surface.

2. The torque fluctuation absorbing apparatus according to claim 1, wherein the loci of the mass member are further seamlessly switched from the locus in which the mass member rolls on the second rolling guide surface to the locus in which the mass member rolls on the first rolling guide surface after seamlessly switching from the locus in which the mass member rolls on the first rolling guide surface to the locus in which the mass member rolls on the second rolling guide surface.

3. The torque fluctuation absorbing apparatus according to claim 1, wherein the plate member includes a plurality of arc shaped inner circumferential side restriction surfaces provided at an inner circumferential portion of the plate member provided radially inward relative to the outer periphery side rolling guide surface the inner circumferential side restriction surfaces arranged in a circumferential direction and restricting the mass member from moving in a radially inward direction.

4. The torque fluctuation absorbing apparatus according to claim 3, wherein each of the inner circumferential side restriction surfaces and each of the outer periphery side rolling guide surfaces are shifted by a half pitch relative to each other in a circumferential direction.

5. The torque fluctuation absorbing apparatus according to claim 1, further comprising:

an annular connection member connecting said plurality of mass members in a manner that the mass members retain a predetermined distance from one another.

6. The torque fluctuation absorbing apparatus according to claim 5, wherein each of said plurality of mass members includes a first engagement portion formed with one of a protrusion portion and a hole portion; and the connection member includes a plurality of second engagement portions each of which is formed with the other of the protrusion portion and the hole portion and to each of which the first engagement portion of said plurality of mass members engages to be movable in a radial direction of the plate member.

7. The torque fluctuation absorbing apparatus according to claim 5, wherein one of the connection member and the plate member is formed with a tapered portion or a protrusion portion at a portion where the connection member and the plate member face each other.

8. The torque fluctuation absorbing apparatus according to claim 1, wherein the he second rolling guide surface is formed in a flat surface.

9. The torque fluctuation absorbing apparatus according to claim 1, wherein the second rolling guide surface is configured to allow the mass member to roll thereon with a smaller turning radius compared to on the arc shaped first rolling guide surface.

10. The torque fluctuation absorbing apparatus according to claim 9, wherein the mass member includes an outer periphery rolling portion rolling on the first rolling guide surface of the plate member and a rolling shaft portion having a smaller outer diameter than the outer periphery rolling portion of the mass member and rolling on the second rolling guide surface.

11. The torque fluctuation absorbing apparatus according to claim 10, wherein the mass member includes at least one of a first mass member and a second mass member;

the second rolling guide surface is formed with an inner surface of a rolling guide hole provided penetrating through the plate member; and said at least one of the first mass member and the second mass member is connected to the rolling shaft portion positioned in the rolling guide hole in a state where one of the first mass member and the second mass member of said at least one of the first mass member and the second mass member is positioned at one of a first side and a second side of the plate member or in a state where the first mass member and the second mass member are positioned at either one of the first side and the second side of the plate member, respectively.

12. The torque fluctuation absorbing apparatus according to claim 11, wherein the plate member includes a recessed portion provided at at least one of a first surface and a second surface of the plate member and including the first rolling guide surface;

said at least one of the first mass member and the second mass member includes the outer periphery rolling portion, the outer periphery rolling portion of said at least one of the first mass member and the second mass member rolls along the first rolling guide surface in a state being positioned at the recessed portion; and the rolling shaft portion rolls along an inner surface of the rolling guide hole forming the second rolling guide surface when the torsional vibration of the power transmission system is assumed to be equal to or greater than the predetermined level.

13. The torque fluctuation absorbing apparatus according to claim 10, wherein the second rolling guide surface on which the rolling shaft portion of the mass member rolls is formed in a configuration shorter in a radial direction and longer in a circumferential direction of the plate member.

14. The torque fluctuation absorbing apparatus according to claim 9, wherein one of the mass member and the plate member is formed with a tapered portion or a protrusion portion at a portion where the mass member and the plate member face each other.

* * * * *